(12) United States Patent
Jennings, III

(10) Patent No.: US 6,854,003 B2
(45) Date of Patent: *Feb. 8, 2005

(54) VIDEO FRAME RENDERING ENGINE

(75) Inventor: Earle W. Jennings, III, San Jose, CA (US)

(73) Assignee: Hyundai Electronics America, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/993,442

(22) Filed: Dec. 18, 1997

(65) Prior Publication Data

US 2002/0002574 A1 Jan. 3, 2002

Related U.S. Application Data

(60) Provisional application No. 60/033,476, filed on Dec. 19, 1996, and provisional application No. 60/050,396, filed on Jun. 20, 1997.

(51) Int. Cl.[7] .................................................. G06F 7/38
(52) U.S. Cl. ...................................... 708/523; 708/524
(58) Field of Search ................................. 708/490, 520, 708/522, 523, 524

(56) References Cited

U.S. PATENT DOCUMENTS

| 3,621,214 A | 11/1971 | Romney et al. |
| 3,833,889 A | 9/1974 | Cray |
| 4,128,880 A | 12/1978 | Cray, Jr. |

(List continued on next page.)

OTHER PUBLICATIONS

McCalpin, J.D., "Sustainable Memory Bandwith in Current High Performance Computers," pp. 1–14, Oct. 12, 1995.
"TinyRISC™ Microprocessor With 16/32–Bit Code Compression," pp. 1–8, downloaded Jul. 24, 1997 from http://www.lsilogic.com/products/unit5_h.html#tinyRISC.
"Accelerated Graphics Port Interface Specification," Revision 1.0, Intel Corporation, Jul. 31, 1996.
"Three Dimensional Geometry Processor MB86242, "Fujitsu (1997).

(List continued on next page.)

OTHER PUBLICATIONS

Hironori Yamamuchi, "Architecture and Implementation of a Highly Parallel Single–Chip Video DSP", IEEE Transaction on Circuits and Systems for Video Technology, vol. 2, No. 2, Jun. 1992, p. 207–216.
Ohad Falik, "NSC's Digital Answering Machines Solution", IEEE International Conference on Computer Design, Oct. 1992, p. 132–137.

*Primary Examiner*—Chuong Dinh Ngo

(57) ABSTRACT

A circuit is provided which contains memory, logic, arithmetic and control circuitry needed to generate all or part of a frame for use in video processing and animation as well as digital signal and image processing. One or more such circuits are provided on an integrated circuit. A video or image frame generation system is constructed from one or more of these integrated circuits, optionally with additional memory circuitry, to provide exceptional performance in frame production for animation, particularly 3-D and other high performance applications such as medical imaging, virtual reality and real-time scene generation in video games and simulation environments. The circuit(s) are used to process high speed object-oriented graphics related streams such as proposed by MPEG 4, as well as act as a single chip JAVA engine with highly optimized numeric performance.

13 Claims, 14 Drawing Sheets

U.S. PATENT DOCUMENTS

| | | | |
|---|---|---|---|
| 4,589,067 A | | 5/1986 | Porter et al. |
| 4,590,465 A | | 5/1986 | Fuchs |
| 4,594,651 A | | 6/1986 | Jaswa et al. |
| 4,594,678 A | | 6/1986 | Uhlenhoff |
| 4,646,075 A | | 2/1987 | Andrews et al. |
| 4,651,274 A | | 3/1987 | Omoda et al. |
| 4,799,144 A | | 1/1989 | Parruck et al. |
| 4,860,191 A | | 8/1989 | Nomura et al. |
| 4,879,559 A | * | 11/1989 | Arambepola .................. 342/25 |
| 4,888,682 A | * | 12/1989 | Ngai et al. ...................... 712/4 |
| 4,949,280 A | | 8/1990 | Littlefield |
| 4,953,107 A | | 8/1990 | Hedley et al. |
| 5,101,365 A | | 3/1992 | Westberg et al. |
| 5,103,217 A | | 4/1992 | Cawley |
| 5,182,797 A | | 1/1993 | Liang et al. |
| 5,184,318 A | | 2/1993 | Briggs et al. |
| 5,187,796 A | * | 2/1993 | Wang et al. ................. 708/520 |
| 5,293,586 A | | 3/1994 | Yamazaki et al. |
| 5,410,649 A | | 4/1995 | Gove |
| 5,418,973 A | | 5/1995 | Ellis et al. |
| 5,481,669 A | | 1/1996 | Pouton et al. |
| 5,522,083 A | | 5/1996 | Gove et al. |
| 5,544,337 A | | 8/1996 | Beard et al. |
| 5,557,759 A | * | 9/1996 | Crump et al. .......... 395/200.49 |
| 5,579,455 A | | 11/1996 | Greene et al. |
| 5,590,252 A | | 12/1996 | Silverbrook |
| 5,594,844 A | | 1/1997 | Sakai et al. |
| 5,598,574 A | | 1/1997 | Yoshinaga et al. |
| 5,600,846 A | | 2/1997 | Gallup et al. |
| 5,630,043 A | | 5/1997 | Uhlin |
| 5,630,153 A | | 5/1997 | Intrater et al. |
| 5,659,495 A | | 8/1997 | Briggs et al. |
| 5,745,125 A | * | 4/1998 | Deering et al. ............. 345/503 |
| 5,747,125 A | * | 5/1998 | Markulin ................... 428/34.8 |
| 5,790,880 A | * | 8/1998 | Ireton .................... 395/800.23 |

OTHER PUBLICATIONS

"MB86242 <Pinolite™> Product Specifications," Fujitsu, Version 1.0, (1997).

"Fujitsu Develops World's First Three Dimensional Geometry Processor," press release, Fujitsu, Downloaded Sep. 5, 1997 from http://www.fujitsu.co.jp/hypertext/news/1997/Jul/2e.html.

* cited by examiner

- OVERALL PCB FOOT PRINT: 125MM * 125MM
- EACH SIDE OF PRINTED CIRCUIT BOARD CONTAINS:
  - (4) EMBODIMENTS
  - (8) SYNCHRONOUS DRAM MODULES (168 PIN) WITH UP TO 16M BY 72 BITS EACH
  - EACH EMBODIMENT HAS 288 MBYTES OF RAM
  - BOOT ROM AND OTHER SUPPORT CIRCUITRY IS NOT DIAGRAMMED HERE

- OVERALL PCB FOOT PRINT: 125MM * 150MM
- EACH SIDE OF PRINTED CIRCUIT BOARD CONTAINS:
  - (8) EMBODIMENTS
  - (8) SYNCHRONOUS DRAM MODULES (168 PIN) WITH UP TO 16M BY 72 BITS EACH
  - EACH EMBODIMENT HAS 144 MBYTES OF RAM
  - BOOT ROM AND OTHER SUPPORT CIRCUITRY IS NOT DIAGRAMMED HERE

VIDEO FRAME RENDERING ENGINE

STATEMENT OF RELATED APPLICATIONS

This patent application claims priority from U.S. Provisional Applications No. 60/033,476, filed Dec. 19, 1996, and No. 60/050,396, filed Jun. 20, 1997. The contents of these provisional applications are herein incorporated by reference in their entirety for all purposes.

BACKGROUND OF THE INVENTION

The present invention relates to circuits. More particularly, the present invention relates to high-performance integrated circuitry suited to the video frame generation task and digital signal processing (DSP) tasks.

The central problem of the graphics industry is to generate frames. Each frame is a rectangular array of pixels, often involving over 1 million pixels. Animation and in particular, 3-D animation, usually requires many millions to many billions of calculations to generate one pixel. Similarly, graphics applications (such as medical imaging) require the generation of one or more frames, again, often in animation sequences.

Consider the example of this need in the 1995 effort by Pixar generating the motion picture *Toy Story*. There are 110,000 frames in the motion picture. Pixar used 87 dual processor 100 MHz Sparc 20's and 30 quad processor 100 MHz Sparc 20's. This is a total of 294 CPU's. There was an average of 96 Megabytes of RAM per CPU and each processing node had a local 3–5 gigabyte local disk drive. The disk farms and their servers are not relevant to this patent, but were quite large. The entire motion picture took 46 days to compute with an average frame taking between 1 to 3 hours of Sparc CPU processor time. See reference [1].

While *Toy Story* was not photo-realistic it did represent a breakthrough. It was the first full length, feature motion picture entirely generated by 3D computer animation technology. Photo-realism for such a film requires at least a factor of 10 more computing complexity. Assume the photo-realistic frames compute in 30 hours.

There are many different programs used in frame generation. See references [19]–[23]. These programs are both complex and need high performance. They are created with high level procedural and object-oriented computer programming languages such as C, C++, and FORTRAN. Only the most performance critical portions of these programs might be directly written in assembly/machine language targeting the underlying rendering engine hardware because of the prohibitive expense and difficulty of programming in assembly/machine language. Floating point arithmetic is popular in these programs because of its wide dynamic range and programming ease.

The need for performance improvements is large. Optimal video editing requires 1 frame every second. Real-time virtual reality needs up to 30 frames generated per second. The performance improvements needed to satisfy these two industrial applications are speedups of 108,000× for video editing (=30 hrs./frame×3600 seconds/hr) and 3,240,000× for virtual reality (=30*Video Editing).

A similar situation exists in high performance Digital Signal Processing. The typical requirement includes processing images, often collected from 2-D and 3-D sensor arrays over time to construct images of the interior of materials including the human body and machine tools.

These multidimensional signal processing applications construct images from banks of ultra-sound or magnetic imaging sensors. This has similar performance requirements to frame generation. These applications have the goal of resolving features in a reconstruction/simulation of a 3-D or 4-D environment. (Note: 4-D here means a 3-D domain observed/simulated over time.) Feature resolution is a function of input sensor resolution, depth of FFT analysis which can be computationally afforded within a given period of time, control of round-off errors and the accumulation of those rounding errors through the processing of the data frames.

Fine feature resolution in minimum time lead to performing millions and often billions of arithmetic operations per generated pixel or output data point. The use of floating point arithmetic to provide dynamic range control and flexible rounding error control is quite common. Algorithmic flexibility is a priority, due to the continuing software evolution and the availability of many different applications. These differing applications often require very different software.

The application software development requirements are very consistent. In particular, most applications need numerous programs, mostly written in the procedural computer programming languages, C, C++ and FORTRAN (see references [11]–[18]); and the use of machine level programming is restricted to the most performance critical portions of the programs.

The target algorithms display the following common features: a need for large amounts of memory per processing element, often in the range of 100 MB; a need for very large numbers of arithmetic calculations per output value (pixel, data point, etc.); a need for very large numbers of calculations based upon most if not all input values (pixel, data point, etc.); and relatively little required communication overhead compared to computational capacity.

Support for high resolution graphics has developed over the last 30 years. Preliminary efforts in the 1960's and early 1970's such as seen in reference [40] created graphics computer systems with a minimum of specialized hardware. There was little or no thought at that time to VLSI (Very Large Scale Integration) integrated circuits (ICs).

The support of the graphics industry by semiconductor devices has focused on the following issues:

A. Support of I/O devices, with the support of the screen display device consuming the bulk of the effort. This has lead to the development of specialized Integrated Circuits to control the screen. See references [2].

B. Development of high speed micro-processors and Digital Signal Processors.

C. Development of high speed and high density memory devices, particularly DRAMs, VRAMs, etc.

D. Special purpose components aimed at real-time image processing and frame generation applictions.

These efforts have fundamental limitations, as is described below.

A. Display device controllers are limited in that each frame is generated by a fixed execution structure machine within a specific amount of time. Thus, the variation of frame algorithms is necessarily limited.

B. High speed micro-processors and DSPs possess great intrinsic algorithmic flexibility and are therefore used in high performance dedicated frame rendering configurations such as the SUN network that generated *Toy Story*. See reference [1]. The advent of the Intel Pentium™ processors brought the incorporation of all the performance tricks of the RISC (Reduced Instruction Set Computing) community. "Appendix D: An Alternative to RISC: The INTEL 80x86"

in reference [30] and "Appendix: A Superscalar 386" in reference [31] provide good references on this. "Appendix C: Survey of RISC Architectures" in reference [30] provides a good overview.

However, commercial micro-processor and DSP systems are severely limited by their massive overhead circuitry. In modern super-scalar computers, this overhead circuitry may actually be larger than the arithmetic units. See references [30] and [31] for a discussion of architectural performance/cost tradeoffs.

C. High performance memory is necessary but not sufficient to guarantee fast frame generation because it does not generate the data—it simply stores it.

D. There have been several special purpose components proposed which incorporate data processing elements tightly coupled on one integrated circuit with high performance memory, often DRAM. However these efforts have all suffered limitations. The circuits discussed in [32] use fixed point arithmetic engines of very limited precision. The circuits discussed in [32] are performance constrained in floating point execution, and in the handling of programs larger than a single processor's local memory.

The proposed special purpose components are optimized to perform several categories of algorithms. These components include:

D1. Image compression/decompression processors. These circuits, while important, are very specialized and do not provide a general purpose solution to a variety of algorithms. For example, such engines have tended to be very difficult to efficiently program in higher level procedural languages such as C, C++ and FORTRAN. The requirement of programming them in assembly language implies that such units will not address the general purpose needs for multi-dimensional imaging and graphical frame generation without a large expenditure on software development. See References [24] and [25].

D2. Processors optimized for graphics algorithms such as fractals, Z-buffers, Gouraud shading, etc. These circuits do not permit optimizations for the wide cross-section of approaches that both graphics frame generation and image processing require. See references [26]–[29].

D3. Signal processing pre-processor accelerators such as wavelet and other filters, first pass radix-4, 8 or 16 FFT's, etc. 1-D and 2-D Discrete Cosine Transform engines. These circuits are difficult to program for efficient execution of the wide variety of large scale frame generation tasks.

D4. Multiprocessor image processors. These processors include mixed MIMD and SIMD systems that are ill-suited to general-purpose programming. See reference [24] and [41] to [43].

These processors also include VLIW (Very Long Instruction Word) SIMD ICs such as Chromatic's MPACT ICs. Such ICs again cannot provide the computational flexibility needed to program the large amount of 3-D animation software used in commercial applications, which require efficient compiler support. See references [34] and [39].

D5. Multimedia signal processors. These processors also have various limitations, such as lack of floating point support, lack of wide external data memory interface access bandwidth to large external memories, deficient instruction processing flexibility and data processing versatility, and reliance on vector processors which are inefficient and difficult to program for operations without a very uniform data access mechanism concerning accumulating results. See references [35]–[38].

What is needed is a computational engine that avoids the above-described limitations with regard to computation for video frame rendering and DSP tasks.

SUMMARY OF THE INVENTION

A circuit is provided which contains memory, logic, arithmetic and control circuitry needed to generate all or part of a frame for use in video processing and animation as well as digital signal and image processing. One or more such circuits are provided on an integrated circuit. A video or image frame generation system is constructed from one or more of these integrated circuits, optionally with additional memory circuitry, to provide exceptional performance in frame production for animation, particularly 3-D and other high performance applications such as medical imaging, virtual reality and real-time scene generation in video games and simulation environments. The circuit(s) are used to process high speed object-oriented graphics related streams such as proposed by MPEG 4, as well as act as a single chip JAVA engine with highly optimized numeric performance.

DEFINITIONS

Wire

Figure 1:
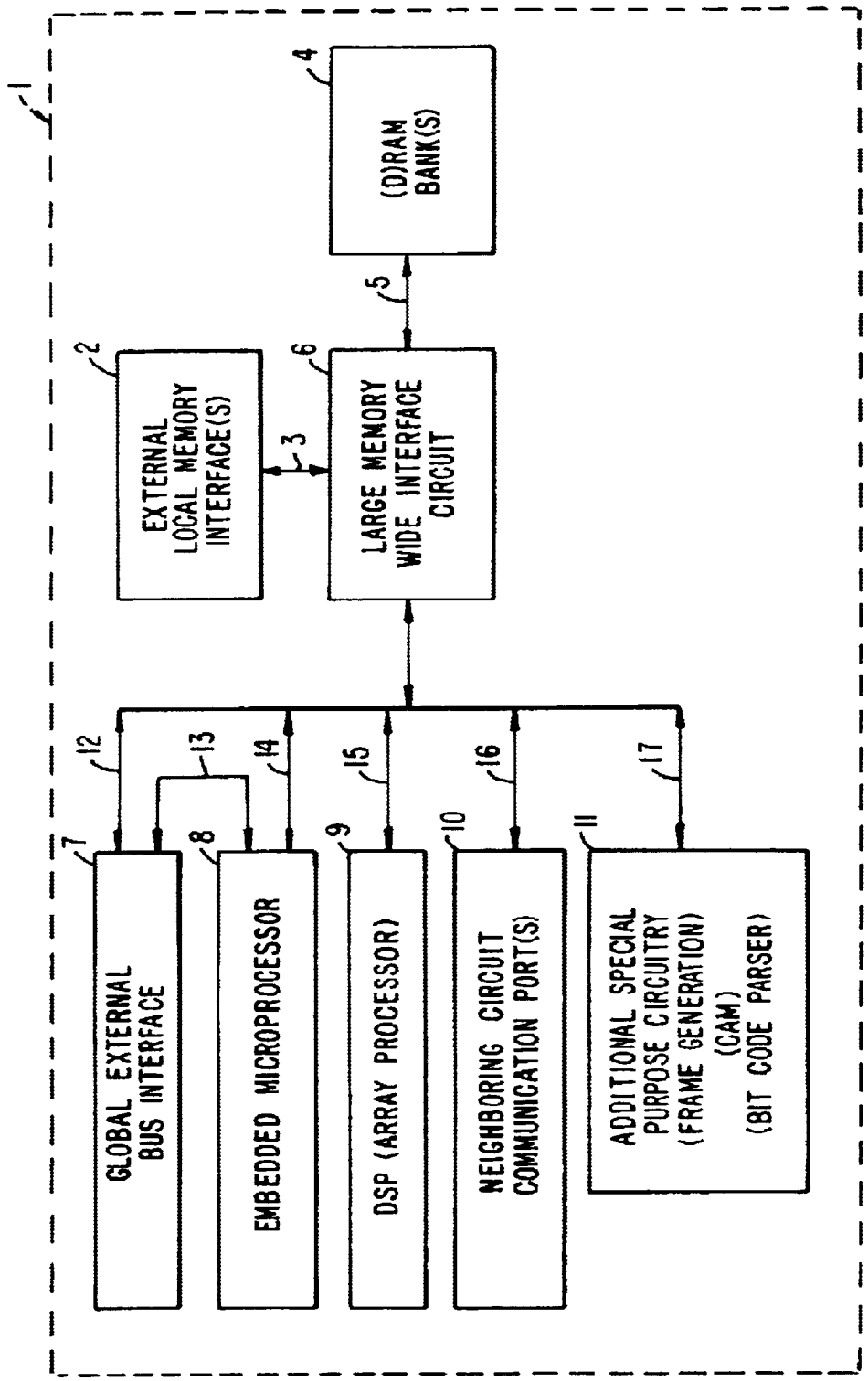
FIG. 1 is a block diagram of a basic circuit according to embodiments of the present invention.

A wire is a mechanism for sharing the state between multiple nodes of a circuit. The state is a finite alphabet based upon certain physical conditions including but not limited to: electrical voltage, current, phase, spectral decomposition, photonic amplitude. Symbols are the individual elements of an alphabet. Measured value ranges of the relevant physical conditions typically encode symbols. The most commonly used alphabet is the set {0,1}, the binary symbol set. Binary systems using all of the above schemes exist. Other commonly used alphabets include 3 symbol alphabets, e.g., {0,1,2}, multiple binary alphabets, e.g., {00,01,10,11}, etc. There are other alphabets in use. A wire may be embodied, for example, as a strip of metal (e.g., in an integrated circuit or on a circuit board), an optical fiber, or a microwave channel (sometimes referred to as a microchannel).

Wire Bundle

A wire bundle is a collection of one or more wires.

Bus

A bus is a wire bundle possessing a bus protocol. The bus protocol defines communication between circuits connected by the wire bundle. A bus will typically be composed of component wire bundles wherein one or more of the component wire bundles will determine which connected components are receiving and which are transmitting upon one or more of the other component wire bundles.

Floating Point

Floating point notation includes a collection of states representing a numeric entity. The collection includes sub-collections of states defining the sign, mantissa and exponent of the represented number. Such notations non-exclusively include binary systems including but not limited to IEEE standard floating point and special purpose floating point notations including but not limited to those discussed in the references of this document. A floating point notation non-exclusively includes extensions whereby there are two sub-collections each containing the sign, mantissa and exponent of a number as above. The numeric representation is of an interval wherein the number resides. A floating point notation additionally includes non-binary systems, wherein the mantissa and exponent refer to powers of a number other than 2.

Programmable Finite State Machine

A programmable finite state machine is a machine which includes a state register, possibly one or more additional registers wherein state conditions, quantities, etc. reside, and a mechanism by which the state register, additional registers, external inputs generate the next value for the state register and possible additional registers.

SIMD

A Single Instruction Multiple Datapath architecture executes the same instruction on more than one datapath during the same instruction execution cycle. A typical extension to this basic concept is the incorporation of "status flag bits" associated with each datapath. These flags enable and disable the specific datapath from executing some or all of the globally shared instructions.

SIMD architectures are optimal in situations requiring identical processing of multiple data streams. The inherent synchronization of these data streams produce advantages by frequently simplifying communications control problems. SIMD architectures become inefficient whenever the data processing becomes dissimilar between the datapaths.

SIMD architectures require a relatively small amount of instruction processing overhead cost because there is only one instruction processing mechanism, shared by the datapaths. The instruction processing mechanism has an instruction fetching mechanism. The datapath collection typically needs only one instruction memory.

MIMD

A Multiple Instruction Multiple Datapath architecture executes distinct instructions on different datapath units. The fundamental advantage of this approach is flexibility. Any data processing unit can execute its own instruction, independently of the other data processing units. However, this flexibility has added costs. In particular, each data processing unit must possess its own instruction fetching, decoding, and sequencing mechanisms. The instruction fetching mechanism frequently possesses at least a small memory local to the data processor. This local memory is often a cache.

(Very) Long Instruction Word Processors (VLIW and LIW, Respectively)

A (Very) Long Instruction Word Processor is a class of architectures whereby there is a single instruction processing mechanism which contains a program counter capable of common operations, such as branches on condition codes, and multiple instruction fields that independently control datapath units. In these architectures, the datapath units often are not identical in structure or function.

Array Processor

An Array Processor is defined as an LIW or VLIW instruction-processing architecture having multiple datapath units arranged into one or more collections. In embodiments of the present invention, as will be described, the datapath collections receive and may act upon a common operand received via a common operand bus having a transmitting unit; each datapath receives one or more additional operands from a memory; each datapath collection contains an instruction memory possessing instruction fields that control the operation of the program controlled elements within; each datapath unit contains one or more multiplier/accumulators (MACs); and each MAC possesses a multiplicity of accumulating registers.

Multiplier-Accumulator

A Multiplier-Accumulator is an arithmetic circuit simultaneously performing multiplication of two operands and addition (and possibly subtraction) of at least one other operand.

Fast Fourier Transform (FFT)

The fast fourier transform is a highly optimized algorithm for generating the spectrum of a signal. See the relevant chapters of references [11], [12], and [15] for thorough discussions of the various involved topics.

Vector Processor

A vector processor is an architecture designed to operate exclusively on vectors. Typically, a vector processor is deeply pipelined. There is a large literature devoted to vector processing. See references [46]–[53]. Appendix B, "Vector Processors" in reference [30] provides an overview on the subject.

DESCRIPTION OF SPECIFIC EMBODIMENTS

The present invention provides a cost-effective basic circuit which encapsulates memory, logic, arithmetic, and specialized circuitry and controls particularly suited to supporting a broad class of algorithms, especially those used for video frame rendering. Replicating the basic circuit increases the computing capacity, creating the capability to support very high performance requirements.

The distinction between high performance, often multi-dimensional, signal processing and high performance frame rendering graphics is slight. For the duration of this document, the discussion will focus on frame rendering from a graphics perspective, with commentary added where necessary to delineate the differences in application of the invention.

FIG. 1 is a block diagram of a basic circuit 1 according to embodiments of the present invention. In the basic circuit 1, one or more controllers 2 for external local memory interface(s) provides access to a local external memory (shown in a later figure) associated with the basic circuit 1. Such local external memory is preferably on the order of 100 megabytes or greater (see *Toy Story*, reference [1]), e.g., to one gigabyte. A Master Memory Interface and Controller (MMIC) 6, also referred to as the "large memory wide interface circuit" 6, controls the flow of data, including instructions, between the external local memory interface(s) 2 and various other components. The MMIC 6 also controls access to an internal local memory 4. The basic circuit 1 also includes a Global External Bus Interface (GEBI) 7, an embedded microprocessor sub-system 8, a DSP (array processor) 9, neighboring circuit communication port(s) 10, special purpose circuitry 11 (e.g., specialized frame generator circuitry, Content-Addressable Memory—CAM, bit code parser, etc.), and wire bundles 3, 5, 12, 13, 14, 15, 16, and 17 which interconnect the circuits as indicated in FIG. 1.

The GEBI 7 provides an interface to the external environment. This external bus may be a standard computer bus such as the well-known Peripheral Component Interconnect (PCI), Accelerated Graphics Port (AGP), Universal Serial Bus (USB), IEEE 1394 (formerly, FireWire), or Fiber Channel; or a special purpose bus designed to support communications between external controller-host(s) and a multiplicity of instances of this invention.

The embedded micro-processor sub-system 8 controls operation of the basic circuit 1 and performs computations not targeting the DSP (array processor) 9 or the special-purpose circuitry 11. The micro-processor sub-system 8 is discussed in more detail below.

The DSP (array processor) 9 performs floating point computations. In one embodiment of the present invention, the DSP (array processor) 9 is as shown and discussed in U.S. Patent application Ser. No. 60/050,396, filed Jun. 20, 1997, incorporated by reference. The DSP (array processor) 9 is discussed in more detail below.

The neighboring circuit communication port(s) 10 provide communication between the basic circuit 1 and other instances of the basic circuit 1 in a system. In system applications wherein only one instance of the basic circuit 1 is used, these port(s) 10 are not needed. An exception to the previous sentence exists in a specific embodiment in which some of these port(s) 10 provide communication with other components (not shown) which are not instances of the basic circuit 1 but which nevertheless benefit from highly concurrent transactions with or via the instance of the basic circuit 1.

Applications having multiple instances of the basic circuit 1 often need high speed, concurrent communications between the instances of the basic circuit 1. By providing the communication port(s) 10, the basic circuit 1 reduces a potential bottleneck in the GEBI 7. In a specific embodiment, the communication port(s) 10 provide dedicated communication between exactly two instances; therefore, the protocols used on each port may be much simpler than, e.g., the bus protocol used in the external bus interface 7.

In general, standard methods are used for inter-instance communication. For example, various communication schemes based on messaging protocols, which are well documented in the art, may be used. Similarly, any of several "semaphore" systems, or handshaking systems, may be used to provide the ability to synchronize and control Concurrent Sequential Processes (CSP) operating upon instances which are not proximate.

Special purpose circuitry 11 exist in various embodiments to provide performance enhancement for otherwise extremely complex or time consuming operations essential to an application. Examples of such circuitry include, but are not limited to: a frame generator for accelerating Z-buffer operations, triangular fills, "BitBlts" and surface texturing; a content addressable memory (CAM) for accelerating pattern matching for fractal compression or transforming a compressed token into a standard handle pointing into a hash table, for instance; and a bit code parser for decoding the command and data headers for highly compressed communications schemes such as MPEG (Moving Pictures Experts Group) and languages such as Java™, which is a trademark of Sun Microsystems.

Internal memory bank(s) 4 contain one or more banks of random access memory (RAM) arrays. These memories are economical dynamic random access memory (DRAM) in embodiments of the invention, but other types of memories may also be used. In a preferred embodiment, one to 32 megabytes (MBs) of total memory, organized in a wide configuration, are provided. Widths of up to 1024 bits (1K bits) are contemplated. Widths above 64 bits are considered to be "wide." Preferred configurations for these memories include but are not limited to:

32K by 64, by 128, by 256, by 512 and by 1K bits;
64K by 64, by 128, by 256, by 512 and by 1K bits;
128K by 64, by 128, by 256, by 512 and by 1K bits;
256K by 64, by 128, by 256, by 512 and by 1K bits;
Etc.

Note that configurations providing access to data lengths other than powers of 2, such as 72, can have advantages. Such configurations support error detection and correction schemes implemented with added, standard logic incorporated in the MMIC 6.

The MMIC 6 (master memory interface and control) is a digital logic circuit which supports a number of functions. If the internal memory banks 4 are DRAM, or require refreshing as does DRAM, then the MMIC 6 automatically refreshes the internal RAM banks 4. The MMIC 6 allows and controls access to the internal RAM banks 4 for reading and writing by the GEBI 7, the embedded microprocessor 8, the DSP (array processor) 9, and, potentially, by instances of the neighboring circuit communications ports 10 and by the special purpose circuitry 11. The MMIC 6 also allows and controls access to the external local memory interface(s) 2 by the GEBI 7, the embedded microprocessor 8, the DSP (array processor) 9, and potentially by instances of the neighboring circuit communications ports 10 and by the special purpose circuitry 11.

In preferred embodiments of the invention, the MMIC 6 includes an Finite State Machine (FSM) to control the data and instruction flow by accepting requests from the modules 7, 8, 9, 10, and 11 for data and/or instructions in the external local memory. The MMIC 6 satisfies them based on a decision algorithm encoded in the FSM. FSMs for data/instruction flow control are well known.

In a preferred embodiment of the invention, separate instruction and data streams are maintained for each of the embedded microprocessor 8, the DSP (array processor) 9, and the special-purpose circuitry 11. These instruction and data streams would typically reside on the external local memory, after having been loaded therein, during program initialization and operation, from the GEBI 7. These instruction and data streams would typically be produced by one or more compilers according to known compiler technology, and may incorporate some amount of handshaking for coordination according to known methods.

In addition to the MMIC 6, the embedded microprocessor 8 and the GEBI 7 provide direction for controlling data/instruction flow in a manner known in the art. For example, the microprocessor 8 can preemptively seize control of the FSM for, e.g., error control, initialization, and capture of bus error transactions on the GEBI 7.

The controller 2 for the external local memory interface(s), or ELMI(s) 2, provide support for external timing and interface conventions to access one or more kinds of external IC memories. For example, the ELMI(s) 2 provide read and write access to RAM and read access to non-volatile memories. If some or all external memory is DRAM-related (see Chapters 6 and 7 in reference [54], then the ELMI(S) 2 support automatic memory refresh. Optimally, the ELMI(s) 2 provide queuing of access requests during refresh. The ELMI(s) 2 optionally also provide queuing of access requests during write, erase and other potentially slow operations.

In embodiments in which at least some of the external memory is programmable and non-volatile (see Chapters 10, 11 and 12 in reference [54]), the ELMI(s) 2 provide writing of specific words and, as appropriate, erasing of blocks of words. Optionally, the ELMI(s) 2 provide additional functions known in the art, such as erase-suspend for non-volatile memory operations, in order to provide advantages in certain applications.

Although not specifically shown in FIG. 1, the basic circuit 1 in alternate embodiments include one or more analog interface components, such as analog-to-digital (A/D) converters, and digital-to-analog (D/A) converters, Voltage Controlled Oscillators (VCOs), etc., and their corresponding wire bundles.

Additional secondary support circuitry in alternate embodiments include, but are not limited to, internal clock multipliers, Phase Locked Loops (PLLs), clock distribution networks, built in self test (BIST) circuitry, boundary scan path(s), etc., which are known in the relevant art.

The basic circuit 1 has a design which is optimized in many ways to provide a high performance computation engine for frame rendering and similar tasks. Significantly, the embedded microprocessor 8, the DSP (array processor) 9, and special-purpose circuitry 11 are provided with the circuit resources to process their individual instructions and data concurrently and with a minimum of stalling for lack of data or instructions. This efficiency arises for example from the overall design and from the design of the individual modules, as described above and below. For example, the wire bundle 13 reduces the bandwidth overhead on the main bus interface (MMIC 6, and wire bundles 12, 14, 15, 16, 17) by providing a dedicated path for interactions, e.g., control, between the global external bus 7 and the embedded microprocessor 8 that is independent of the primary flow transactions on the main bus interface. In this way, the bandwidth of the main bus interface is conserved.

In a preferred embodiment, the basic circuit 1 is implemented as an integrated circuit (IC). Importantly, the basic circuit 1 can be implemented using relatively low amounts of IC surface area due to its design. Also, the architecture is simple and flexible enough to permit compilers to efficiently target its computation units, especially the microprocessor and the array processor.

Figure 2:
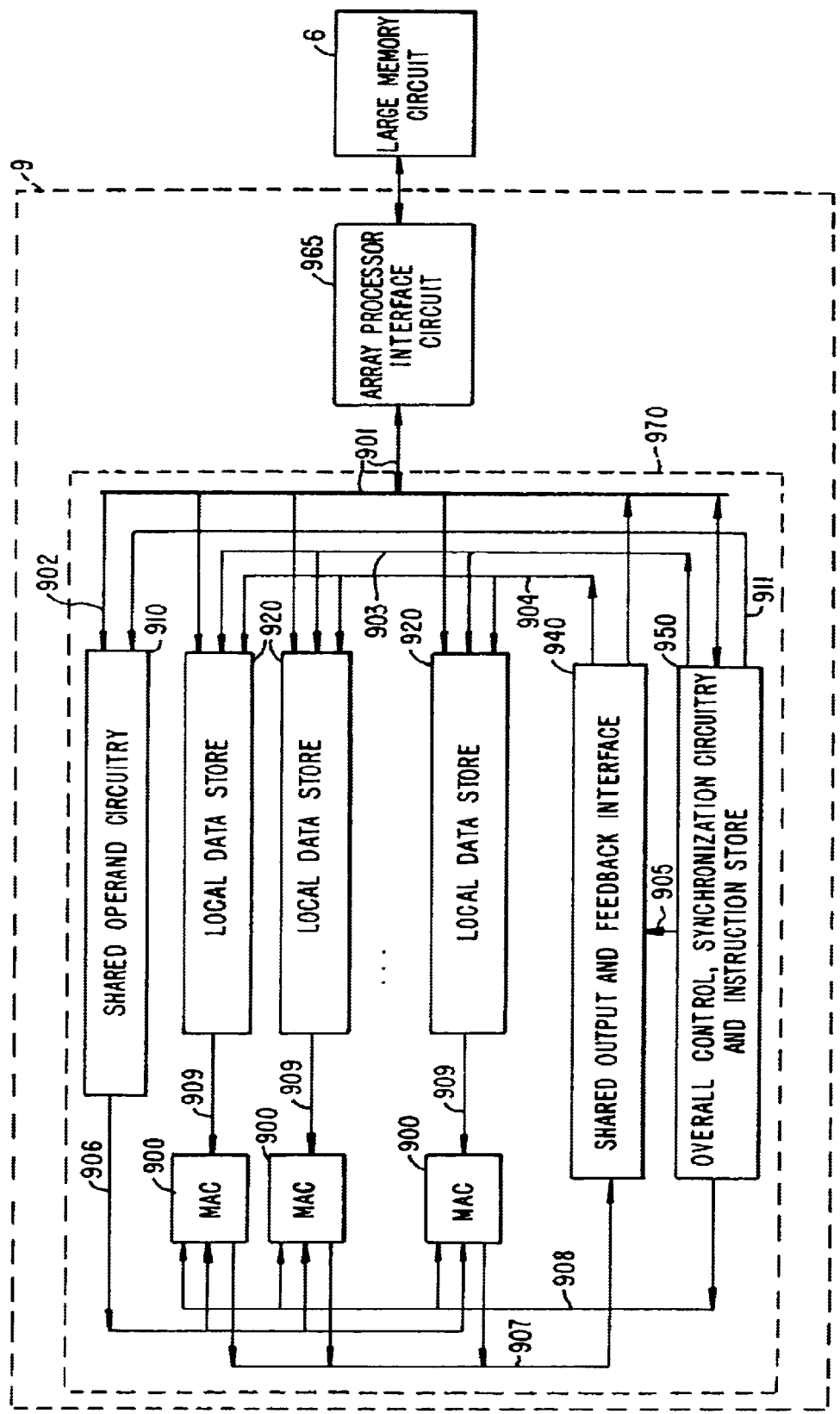
FIG. 2 is a block diagram of the array processor of FIG. 1 according to an embodiment of the present invention.

FIG. 2 is a block diagram of the array processor 9 of FIG. 1 according to an embodiment of the present invention. As will be clear from the discussion below, the array processor 9 is capable of performing calculations that cannot be efficiently processed in parallel using prior-art vector processing techniques, as discussed in the cited references.

The calculations include, for example, calculations requiring several relatively short vectors. For example, in calculating complex valued functions such as $X=(az+b)/(cz+d)$, wherein a, b, c, d, and z are all complex floating point numbers. As is well-known, these calculations and similar calculations are common in frame rendering. To calculate the function, a0, b0, c0, d0, z0 and X0 are defined as the real components and correspondingly, a1, b1, c1, d1, z1 and X1 are defined as the imaginary components. The calculation prior to entry into a floating point division circuit proceeds in two multiply-accumulate passes. In the first pass, the following are calculated:

$$A0=a0*z0-a1*z1+b0$$

$$A1=a0*z1+a1*z0+b1$$

$$B0=c0*z0-c1*z1+d0$$

$$B1=c0*z1+c1*z0+d1$$

In the second pass, the results of B0 and B1 are fed back into multiplier-accumulators (discussed later) as shared operands to generate:

$$C0=A0*B0-A1*B1$$

$$C1=A1*B0+A0*B1$$

$$D=B0*B0+B1*B1$$

Finally, the division operations are performed:

$$X0=C0/D$$

$$X1=C1/D$$

According to the embodiment of FIG. 2, an array processor interface circuit (APIC) 965 controls the requesting and receiving of instructions and data from the MMIC 6 and the sending of data to the MMIC 6. The array processor 9 in this embodiment has a single collection 970 of multiple datapath processing units 900. The datapath processing units 900 are also referred to simply as datapaths 900. The collection 970 forms an Arithmetic Processing Unit (APU) 970.

Within the APU 970, an internal floating point notation is used. This internal notation may or may not be the same as the floating point notation(s) used externally. In general, the APU 970 is adapted to expect at least a standard external notation, e.g., standard IEEE floating point notation. In a preferred embodiment, the floating point notation used is a simplified notation that does not include the exceptional cases of, e.g., standard IEEE floating point notation. Using the simplified notation enables greater internal efficiency, e.g., with regard to circuit size, by avoiding the complexity of the exceptional cases. Using the simplified notation is practical because the exceptional cases are typically not of great relevance in frame rendering and DSP applications.

The APU 970 includes a shared operand circuit (SOC) 910 which acts as a multiplier input circuit. Optionally, the SOC 910 includes a RAM circuit having address controls that determine whether the RAM may be used as an operand cache or a first-in-first-out (FIFO) queue. A first sub-circuit (not shown in the figure) within the SOC 910 includes a multiplicity of input registers for accepting input and capturing the state of the wire bundle 902. The SOC 910 contains a second sub-circuit (not shown) coupled to the registers within the first sub-circuit. The second sub-circuit includes an integer Arithmetic Logic Unit (ALU) (not shown). The second sub-circuit performs fixed point add/subtracts (in the ALU) on selected fields of the state of the wire bundle 902 from the registers. The second sub-circuit also converts the fixed point result of the add/subtract operation or of the selected fields of the input registers into an internal floating point notation according to known conversion algorithms. Therefore, the second sub-circuit is said to contain a floating point conversion unit (not shown).

The APU 970 also includes two or more Multiplier/ACcumulators (MACs) 900 as the datapath processing units 900. MACs are well-known in the relevant art. Each MAC 900 is coupled to wire bundle 906 for receiving a shared operand from the SOC 910. Each MAC 900 is also coupled to a corresponding Local Data Store 920. In general, there are as many local data memory circuits 920 as MACs 900.

During operation, each MAC 900 receives 3 numbers X, Y and Z in some numeric format, wherein X is the shared operand received via wire bundle 906, and Y and Z are received from the local data store 920 via wire bundle 909.

Each MAC 900 possesses two or more registers, preferably at least four. Each MAC 900 can perform a multiplication and an add/subtract in each clock cycle to thereby generate XY+Z or XY−Z from values of X, Y and Z received in the (possibly) current or predecessor clock cycles. Each MAC 900 conditionally stores the generated result in one of its registers.

The APU 970 further includes a Shared Output and Feedback Interface (SOFI) 940. The SOFI 940 contains a floating point conversion unit (not shown) that is adapted using standard techniques to convert the internal numeric format of a wire bundle (907) to the requisite floating point (e.g., IEEE floating point) or fixed point notation needed externally. Of course, in embodiments in which the internal floating point representation is identical to the external representation, then that particular conversion need not be performed. The SOFI 940 controls the transmission of the results of such conversions upon a wide bus 901 to the APIC 965. In a particular embodiment, the SOFI 940 also temporarily stores such results as necessary prior to transmission.

The data memory 920 has a corresponding address generator (in, e.g., module 950, discussed below) for providing addresses for access. The addresses used to fetch the Y and Z operands may or may not be identical. By supporting generation of distinct addresses, an advantage is provided for many applications requirements, such as FFTs.

The APU 970 includes an overall Control, Synchronization circuitry and Instruction Store unit (CSIS) 950. The CSIS 950 performs control and synchronization of the various modules of the APU 970 and includes storage for instructions. Given the architecture of the APU 970 as shown in FIG. 2 and discussed herein, the CSIS 950 has an appropriate structure for carrying out its tasks. In particular, the CSIS 951 includes (not shown in FIG. 2) a status register, a program counter, two or more loop counters, at least one index register for each Y and Z operand local memory 920 associated with each MAC 900, an instruction register, and an instruction store, all of which components are well-known in the art. The instruction word possesses distinct fields for each of the input, output distribution, MACs 900.

The status register optionally preserves at least a multiplicity of wire states. These wire states include at least state condition bits of the loop counters, a zero detect signal from the integer ALU of each SOC 910, and condition bits of the floating point conversion unit of the SOFI 940 of each APU 970.

The CSIS is adapted to request instructions (via the MMIC 6 and the APIC 965) and to buffer these instructions in its instruction store.

The wire bundle 903 provides inputs to the local data stores 920. The wire bundle 903 contains at least: the addresses for the component memories of each local data memory 920, and the read/write controls and page interleaving control signals of each local data memory 920.

Each APU 970 operates on two vectors, as in "vector added to vector" operations, or on one vector and a scalar, as in "scalar multiplying the elements of a vector" operations. The APU 970 is extremely versatile because an input operand is shared amongst a multiplicity of MACs and because a local memory circuit (920) or the state of another MAC's register provides the other two operands.

The array processor 9 according to the present invention enables types of computations to be performed which could not be efficiently performed using, e.g., vector processors. For example, in the calculation of several Discrete Wavelet Transform Filters (DWTFs) it is frequently necessary to share several different scalars across several sub-components of a vector. Vector processors typically required as many cycles to perform this task as the number of scalars to be shared. In these DWTFs, every even input affects all the filter outputs, and the odd inputs affect only half the filter outputs. Processing four inputs in this manner forces the limitation that the odd entries cannot be concurrently processed using the vector processor approach. In the array processor 9, however, these problems are minimized, for example because it can send two (or more) odd-entry scalar elements to different components of a vector. Radix 2 FFTs present both the sum and difference to differing components of a vector. The present invention, by presenting these in parallel to the respective components of the vector achieves the result in one cycle, rather than two cycles per pair of elements required by vector processors.

Figure 3:
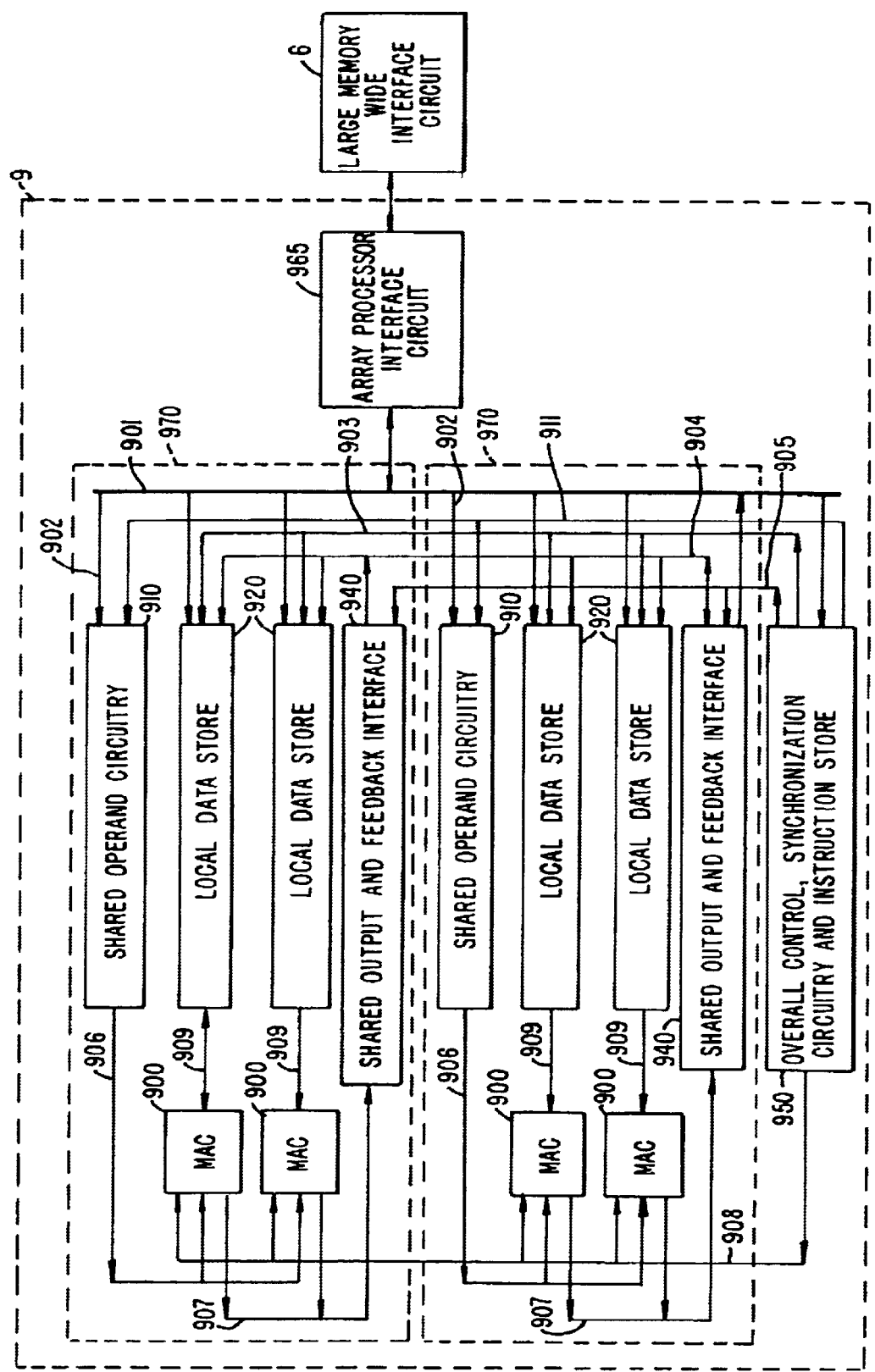
FIG. 3 is a block diagram of the array processor of FIG. 1 according to another embodiment of the present invention.

FIG. 3 is a block diagram of the array processor 9 of FIG. 1 according to another embodiment of the present invention. As shown in FIG. 3, the array processor 9 has two APU 970. This configuration provides for added concurrency for applications in which floating point calculations are expected to be especially plentiful in relation to other calculations to be performed by other modules, e.g., the embedded microprocessor. In further embodiments, the number of APUs 970 in the basic circuit 1 can be increased beyond two.

The array processor 9 according to FIG. 3 is used in a preferred embodiment in which (referring to FIG. 1) the basic circuit 1 is streamlined to include, in addition to the array processor 9 according to FIG. 3, the GEBI 7, the ELMI(s) 2, the embedded microprocessor sub-system 8, and neighboring circuit communication port(s) 10, as necessary, but no additional special purpose circuitry 11, no memory banks 4, and therefore a master interface and control (MIC) 6 which omits the memory controller of the MMIC 6.

Figure 4:
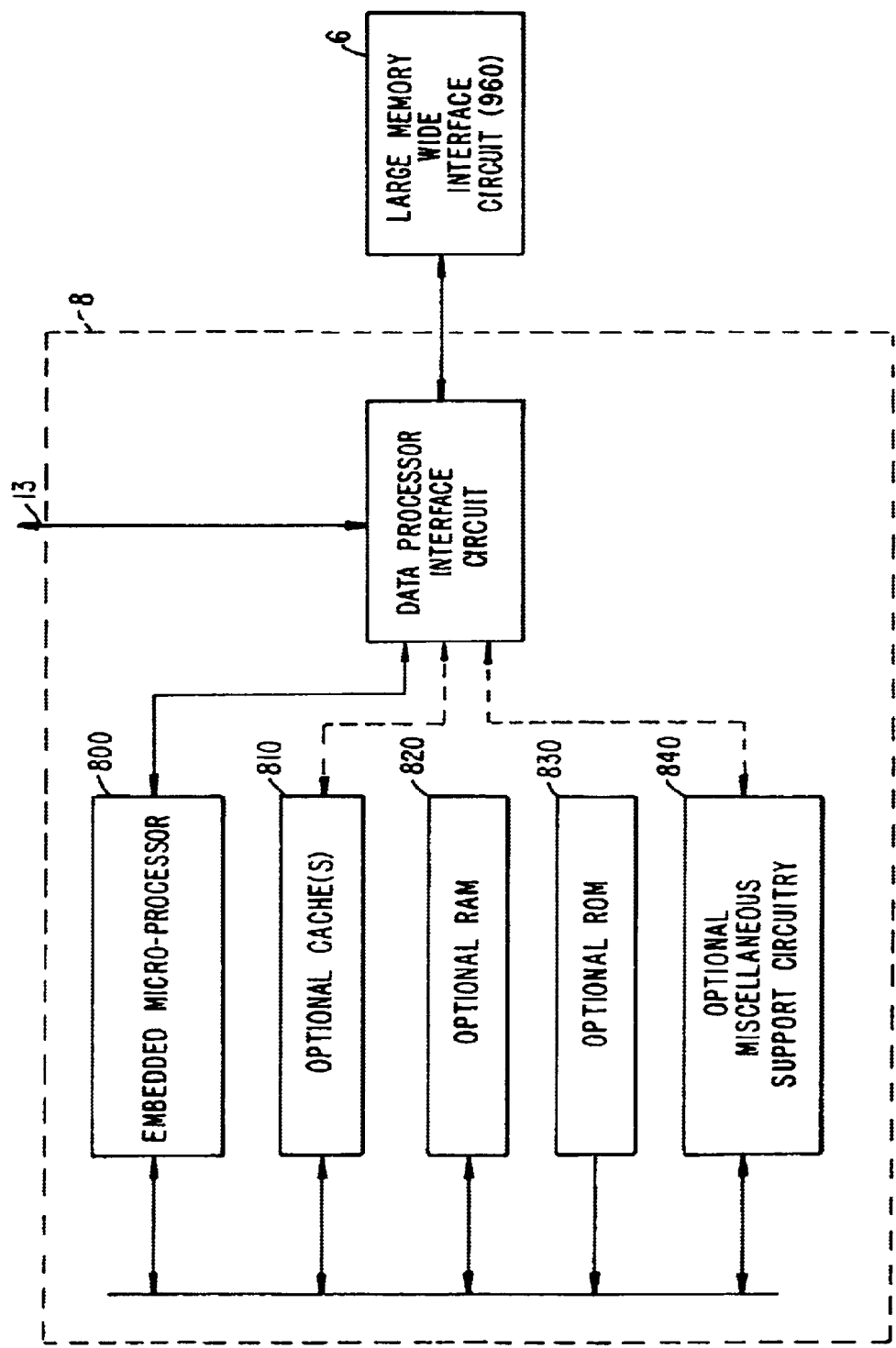
FIG. 4 is a block diagram of the embedded microprocessor of FIG. 1.

FIG. 4 is a block diagram of the embedded microprocessor subsystem 8 of FIG. 1. Embedded microprocessors are well-known in the relevant art. As shown in FIG. 4, the embedded micro-processor sub-system 8 includes microprocessor(s) 800. The microprocessor 800 can be implemented as a byte-code machine such as a Java or MPEG-4 engine, a Programmable Finite State Machine (PFSM), or a RISC engine, preferably a 16 bit instruction set RISC with a 32 bit data path, such as the ARM7TDMI (see reference [56]) or the MIPS16 (see reference [55]).

The embedded micro-processor sub-system 8 also includes an optional local cache 810, preferably 2–4 way interleaved with at least 64 pages and a total memory of at least 1K words of memory. Typically, the cache memory 810 is organized as, e.g., 32 bit words. The cache memory 810 may contain two component caches, one for instructions and one for data.

The embedded microprocessor subsystem 8 also includes additional optional local storage, such as a RAM 820 or a ROM 830, as is known in the relevant art. The ROM 830 may contain, e.g., initialization information for the microprocessor subsystem 8 and/or for the basic circuit 1.

In a preferred embodiment, the microprocessor(s) 800 provides a two version instruction set: one version being 16 bits in length, which contains the most common instructions used by code generated with compiler technology; and the other version being 32 bits in length. Such microprocessors are known in the relevant art. The advantage of such microprocessors is that most of the generated program code will be in the 16 bit format. In each microprocessor 800, each instruction fetch of 32 bits or more can provide the next 1 to 3 instructions without recourse to further instruction memory accesses.

The basic circuit 1 and array processor 9, as discussed herein, reveal an architecture, or class, of circuitry which has a number of notable advantages.

One such advantage is that the circuit 1 possesses very high levels of efficiency in executing specific computationally intensive algorithms in an environment compared to the performance of such algorithms on comparable sized printed circuit boards using microprocessors or conventional DSPs.

In general, the basic circuit 1 has a lower requirement for circuit size compared to other mechanisms available to achieve the same results. Therefore, the basic circuit 1 is cheaper than other mechanisms for achieving the same results. One factor in the array processor 9's low circuit size requirement is that it does not directly implement the division operation, which is actually not very common in a great number of frame rendering and DSP algorithms of interest. In embodiments of the array processor 9 in which the MACs are configured to support only single-precision arithmetic, as is typically sufficient for a large class of frame rendering and DSP applications, the array processor 9's circuit size requirement is substantially further reduced.

The architecture of the array processor 9 provides a "front end" of fixed point addition/subtraction followed by floating point conversion (in, e.g., SOC 910), then multiplication and accumulation (in MACs 900). This "front end" can perform preliminary operations involved with symmetric, anti-symmetric FIRs, and some low radix FFT calculations. These operations are extremely useful in practical DSP applications wherein the data is often received in a fixed point version from sampling circuitry which typically generate between 8 and 16 bits of fixed point precision.

Another advantage of the array processor 9 relates to the general phenomenon of accumulating rounding errors. It is very important that DSP algorithms maintain the precision of arithmetic results. For efficiency, many prior DSP processors use algorithms that perform fixed-point arithmetic. Such fixed-point arithmetic requires a great deal of care in managing rounding errors to maintain precision. In contrast, the array processor 9 is able to efficiently perform floating point computations. Floating point computations have the advantage of providing much better dynamic range, while being considerably easier to program for the same precision of results.

It is interesting to examine the capabilities of a specific, example embodiment of the array processor 9. In the example embodiment, the array processor 9 (according to FIG. 3) receives, in its APIC 965, at least 128 bits from the MMIC 6. The SOC 910 of each APU 970 can simultaneously receive at least 64 bits (preferably 128 bits). The SOC 910 can decompose the received data into fixed 8 bit or 16 bit integer fields. The SOC 910 can be add or subtract these fields in collections of up to 4 simultaneously. The configuration of this example embodiment can achieve extremely high performance in computing radix-4 FFTs, among other computations.

In the example embodiment, the array processor subsystem 9 has an internal clock rate of 200 megahertz (MHz). The following operations can be performed in every clock cycle: four single precision floating point multiplies and 4 single precision floating point additions; an integer/fixed point add/subtract operation, integer/fixed point to floating point scaled conversion; and floating point to fixed point scaled conversion. In the example embodiment, the local data stores 920 are two-way interleaved to support concurrent loading from data received from accesses via the MMIC 6 while fetching the Y and Z operands for the corresponding MAC 900.

In the example embodiment, a communications scheme is embodied in the implementation of the GEBI 7, the MMIC 6, the embedded micro-processor sub-system 8, the ELMI(s) 2, and the array processor 9's APIC 965, using standard techniques, to permit the array processor 9 to stay fully active on the order of 75% of the time for the types of frame rendering and DSP applications envisioned. This performance assumption is reasonable based upon the locality of the data to the basic circuit 1 and to its internal array processor 9.

The resulting performance of the example embodiment, given the above assumptions would be one to three gigaflops (billion floating point operations per second) for many DSP and specific frame rendering algorithms.

Assuming that the basic circuit 1 is implemented in a standard IC package such as 176-pin TQFP (Thin Quad Flat Pack), then each IC would take up roughly one square inch of printed circuit board space. Thus, an embodiment of the present invention can be implemented as a PCI bus card capable of holding up to 32 of these ICs, thereby delivering roughly 16 times the performance of a Silicon Graphics Workstation (see *Toy Story*, reference [1]) at a fraction of the cost.

The present invention is particularly suited for use in applications involving Java (see references [64]–[65]) and interactive audio-video languages such as MPEG-4 (see references [57] to [63]). The MPEG-4 standards activity is developing an environment where a wide variety of algorithms can run on customer targeted hardware. Java is essentially machine independent in its definition and possesses the semantic capability to create and invoke very complex and computationally expensive algorithms. The present invention provides high performance support of network appliances.

Supplemental Description of Some Embodiment(s)

Some embodiments of the present invention might be supplementally described in a stylized, outline form as an integrated circuit including:
  one large memory wide interface circuit wherein the large
    memory may or may not be located within the integrated circuit wherein the large memory wide interface
    circuit is connected to the large memory by a bus B0
    comprising aa wire bundle D0 wherein:

bi-directional transceivers within the large memory wide interface circuit connect the wire bundle D0 of said connecting bus B0, providing the transfer of data between the large memory wide interface circuit and the large memory;
one or more data processing circuits including:
either programmable finite state machine (PFSM) or micro-processor; and
a data processor interface circuit to the large memory wide interface wherein the data processor circuit is connected to the large memory wide interface circuit by a bus B1 wherein both circuits comprise:
bi-directional transceivers connect a wire bundle component D1 of said connecting bus B1; and
local memory circuitry to provide the ability to store the asserted and/or sensed state of said connecting component wire bundle D1 of said connecting bus B1 in said local memory circuitry so as to retain the state information after the state may no longer be asserted and therefore sensed upon said connecting component wire bundle D1 of said connecting bus B1;
wherein the signal state of wire bundle D1 of said bus B1 contains some or all of the signal state of D0 translated forward or backward in time, i.e. a mechanism whereby data may be transferred to or from wire bundle D0 of said bus B0;
one or more array processors each including an array processor interface circuit to the large memory wide interface circuit, a shared operand input circuit, a multiplicity of multiplier/accumulators, and a shared multiplier output circuit and an instruction decoder circuit wherein:
the array processor interface circuit connection to the large memory wide interface circuit comprises of a bus B2 wherein both the interface circuit and the large memory wide interface circuit includes:
bi-directional transceivers connected to a connecting wire bundle component D2 of said connecting bus B2; and
local memory circuitry to provide the ability to store the asserted and/or sensed state of said connecting component wire bundle D2 of said connecting bus B2 in said local memory circuitry so as to retain the state information after the state may no longer be asserted and therefore sensed upon said connecting component wire bundle of said connecting bus B2;
wherein the signal state of wire bundle D2 of said bus B2 contains some or all of the signal state of D0 translated forward or backward in time, i.e. a mechanism whereby data may be transferred to or from wire bundle D0 of said bus B0;
the shared operand input circuit is connected to the array processor interface circuit by a bus B3 and additionally, the shared operand input circuit is connected to the shared multiplier output circuit and to the local data memory circuits associated with each multiplier/accumulator by a bus B4 wherein:
the shared operand input circuit receives some or all of the state information of wire bundle;
each multiplier-accumulator comprising the multiplication and addition mechanism, plus two independently addressable Random Access Memories wherein:
the multiplication and addition mechanism shares one multiplier input and is provided two other inputs from two independently addressable random access memories which may or may not be read only memories;
each of the Random Access Memory address and control wire bundles are components of the control wire bundle (CWB);
the multiplication and addition mechanism possesses one output driver to a wire bundle MO which is shared the multiplier-accumulators and the multiplier output circuit; and
each output driver is controlled by a wire bundle component of the control wire bundle CWB; and
the multiplier output circuit comprising the MO wire bundle interface, the multiplier output memory circuit and the multiplier output interface wherein:
the MO wire bundle interface comprises input circuitry connected to the MO wire bundle;
the multiplier output circuit is connected to the MO wire bundle interface circuitry's input circuitry in such a manner as to provide data to be stored in the memory circuitry; and
the memory output circuitry is connected to the multiplier output interface whereby the state of the memory circuitry can be output from the memory output interface onto either a component wire bundle or the entire bus B3.

In an embodiment, the bus B0 additionally includes component wire bundles D0A and D0C wherein:
output drivers within the large memory wide interface circuit connect the wire bundle D0A of said connecting bus B0, providing the address signals required to access the large memory data; and
output drivers within the large memory wide interface circuit connect the wire bundle D0C of said connecting bus B0, providing the control signals required to access the large memory data.

In an alternative embodiment, the bus B0 additionally includes a component wire bundle D0F wherein:
input drivers within the large memory wide interface circuit connect the wire bundle D0F of said connecting bus B0, providing the feedback signals used to communication the status of the large memory data access.

In an embodiment, at least one of the communications interfaces to external circuitry provides a communications interface to a bus in which the claimed circuit acts as a bus master.

In an embodiment, at least one of the communications interfaces to external circuitry provides a communications interface to a bus in which the claimed circuit acts as a bus slave.

FIGS. 5 through 12 illustrate using the invention to provide near linear speedup to video frame generation tasks and other mostly parallel calculations. As the level of integration grows, there are significant advantages to clustering the external memory interface communication paths into a shared external memory interface. Each external memory interface places a significant economic burden on the production cost by adding many pins to each IC. This increasingly affects not only die size but also thermal dissipation and power consumption. Sharing an external memory interface in this manner economically optimizes communications bandwidth with regards to manufacturing costs.

Figure 5:
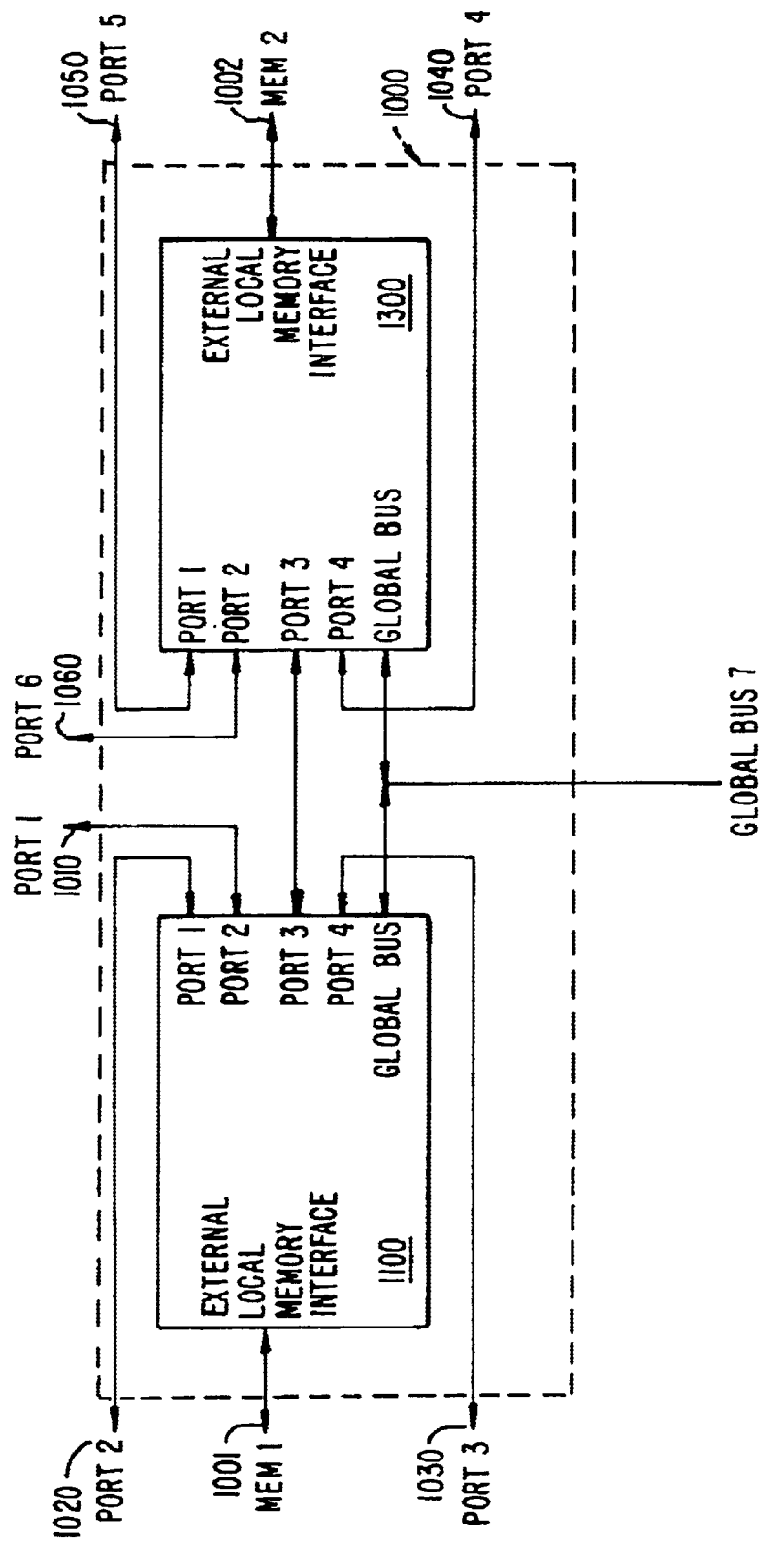
FIG. 5 is a block diagram of an integrated circuit having two instances of the basic circuit of FIG. 1 with independent external memory interfaces.

FIG. 5 is a block diagram of an integrated circuit having two instances of the basic circuit of FIG. 1 with independent external memory interfaces.

Figure 6:
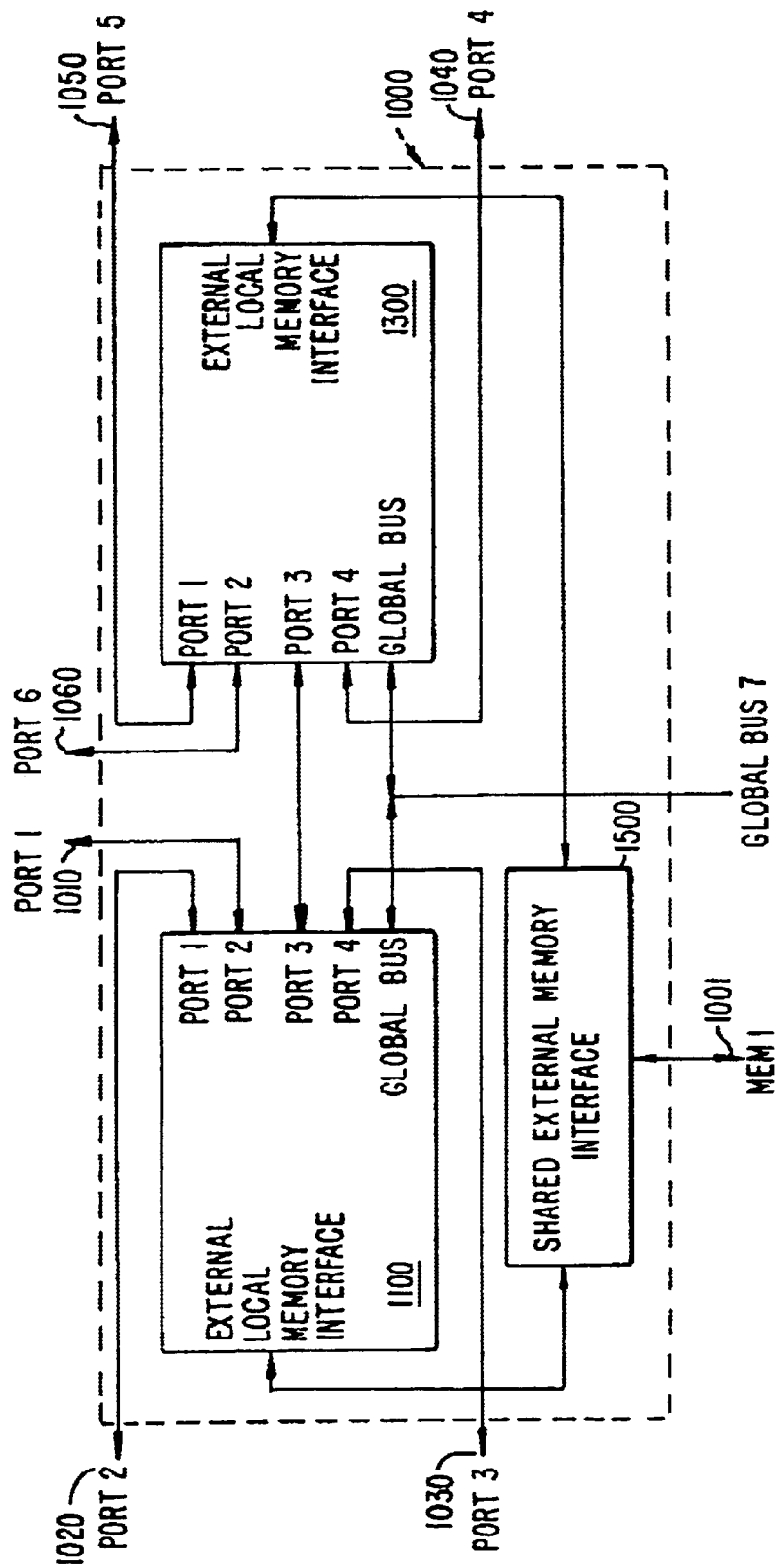
FIG. 6 is a block diagram of an integrated circuit having two instances of the basic circuit of FIG. 1 sharing one external memory interface
Figure 7:
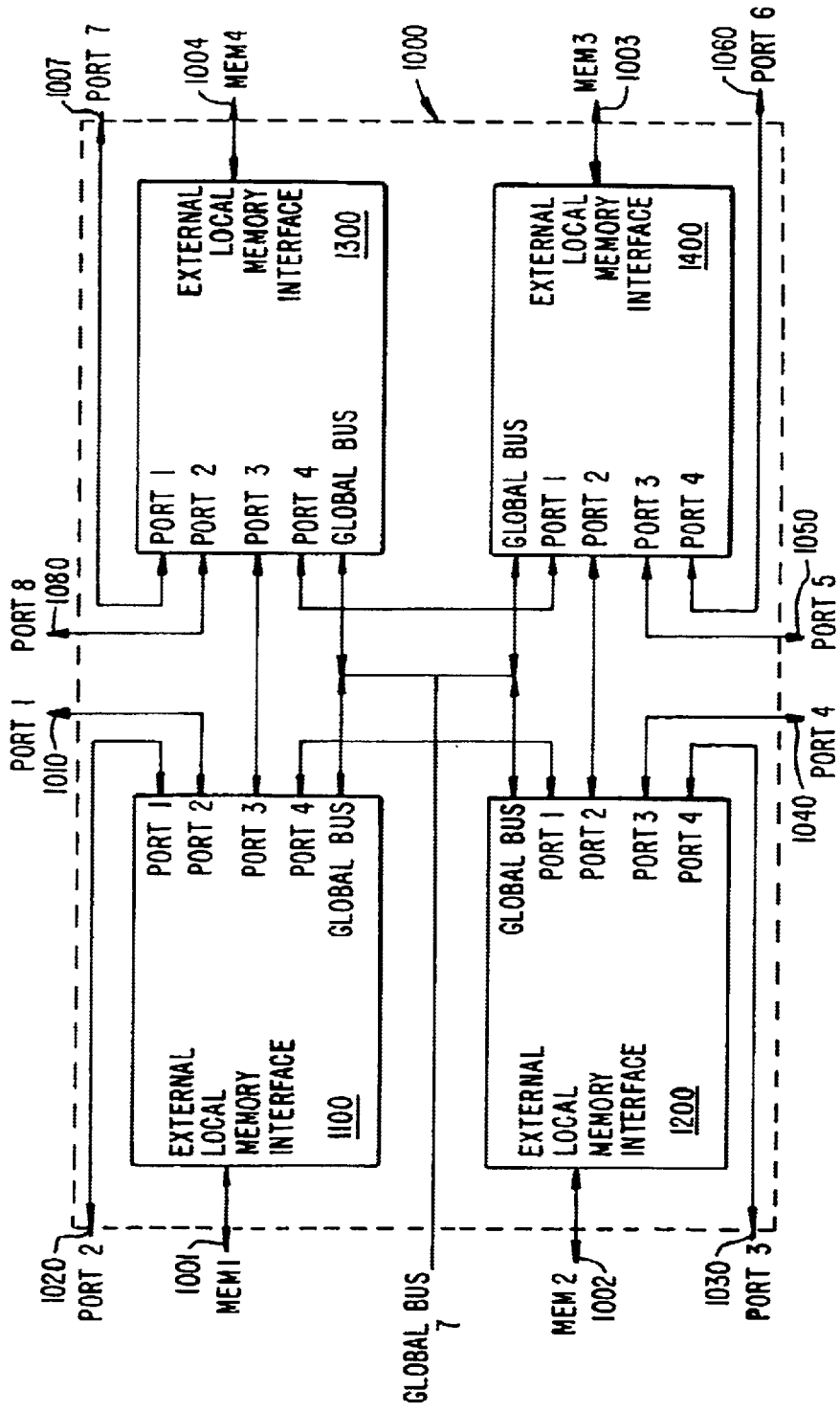
FIG. 7 is a block diagram of an integrated circuit having four instances of the basic circuit of FIG. 1 with independent external memory interfaces
Figure 8:
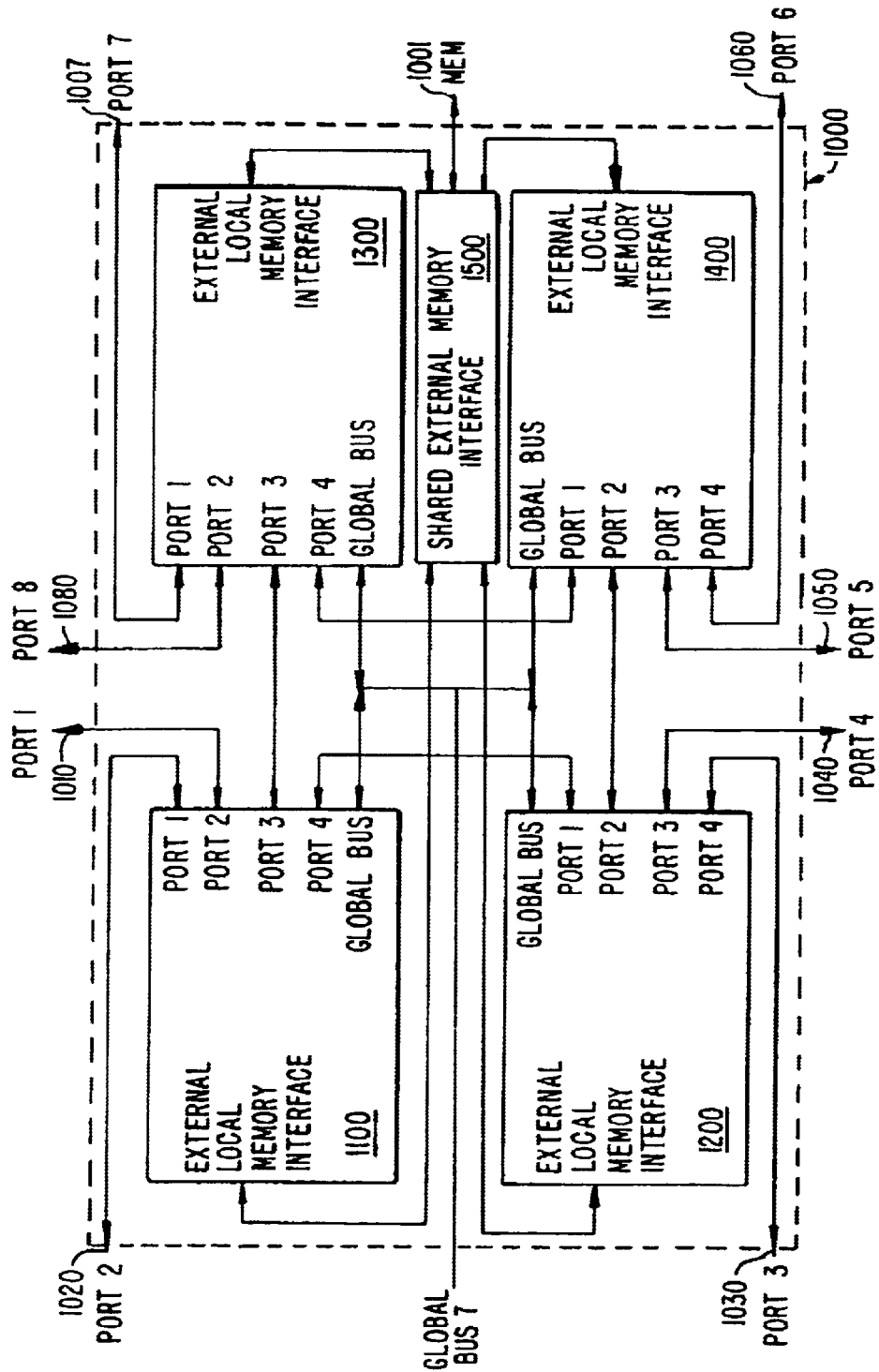
FIG. 8 is a block diagram of an integrated circuit having four instances of the basic circuit of FIG. 1 sharing one external memory interface.

FIG. 6 is a block diagram of an integrated circuit having two instances of the basic circuit of FIG. 1 sharing one external memory interface FIG. 7 is a block diagram of an integrated circuit having four instances of the basic circuit of FIG. 1 with independent external memory interfaces FIG. 8 is a block diagram of an integrated circuit having four instances of the basic circuit of FIG. 1 sharing one external memory interface.

Figure 9:
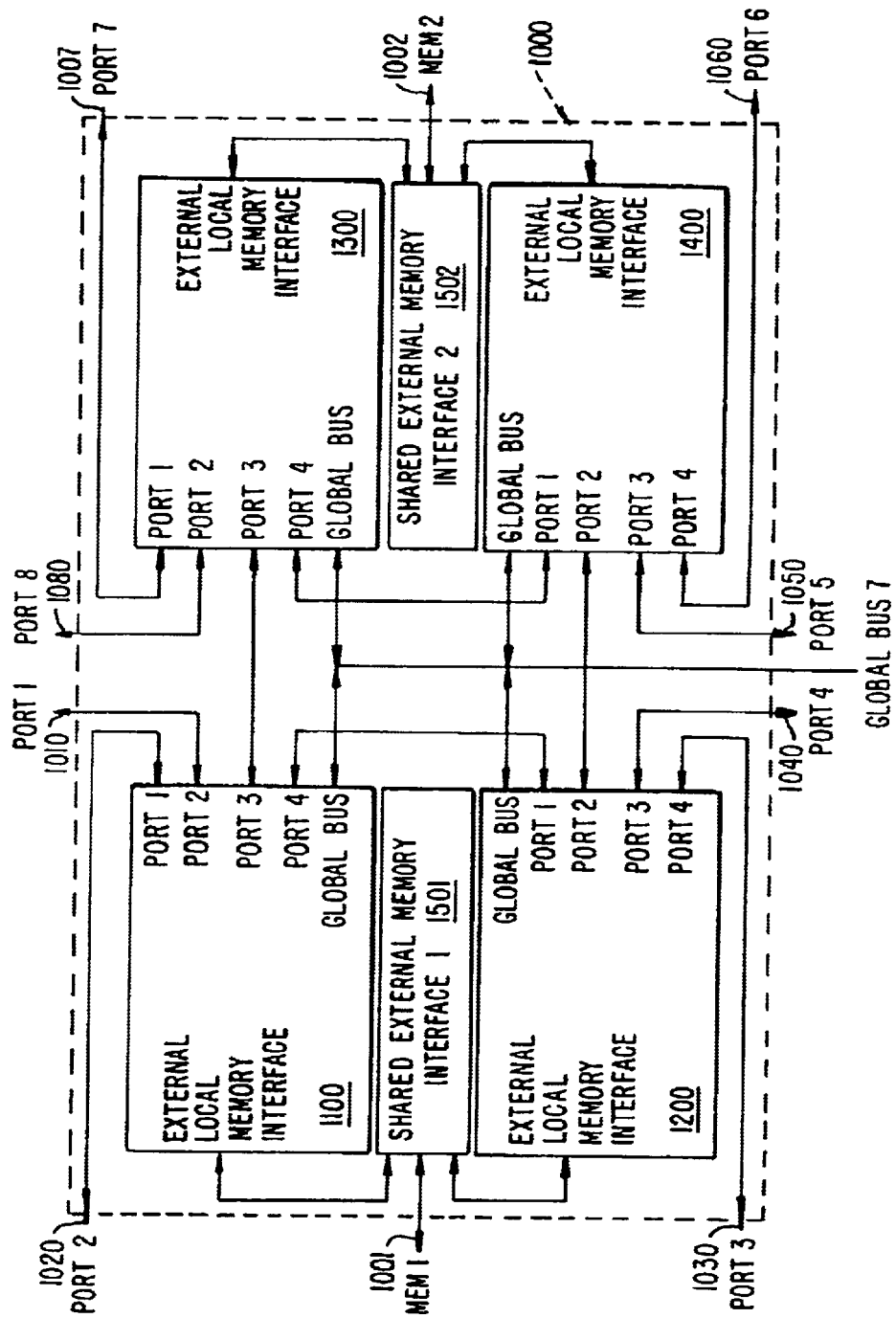
FIG. 9 is a block diagram of an integrated circuit having four instances of the basic circuit of FIG. 1 sharing two external memory interfaces.

FIG. 9 is a block diagram of an integrated circuit having four instances of the basic circuit of FIG. 1 sharing two external memory interfaces.

Figure 10:
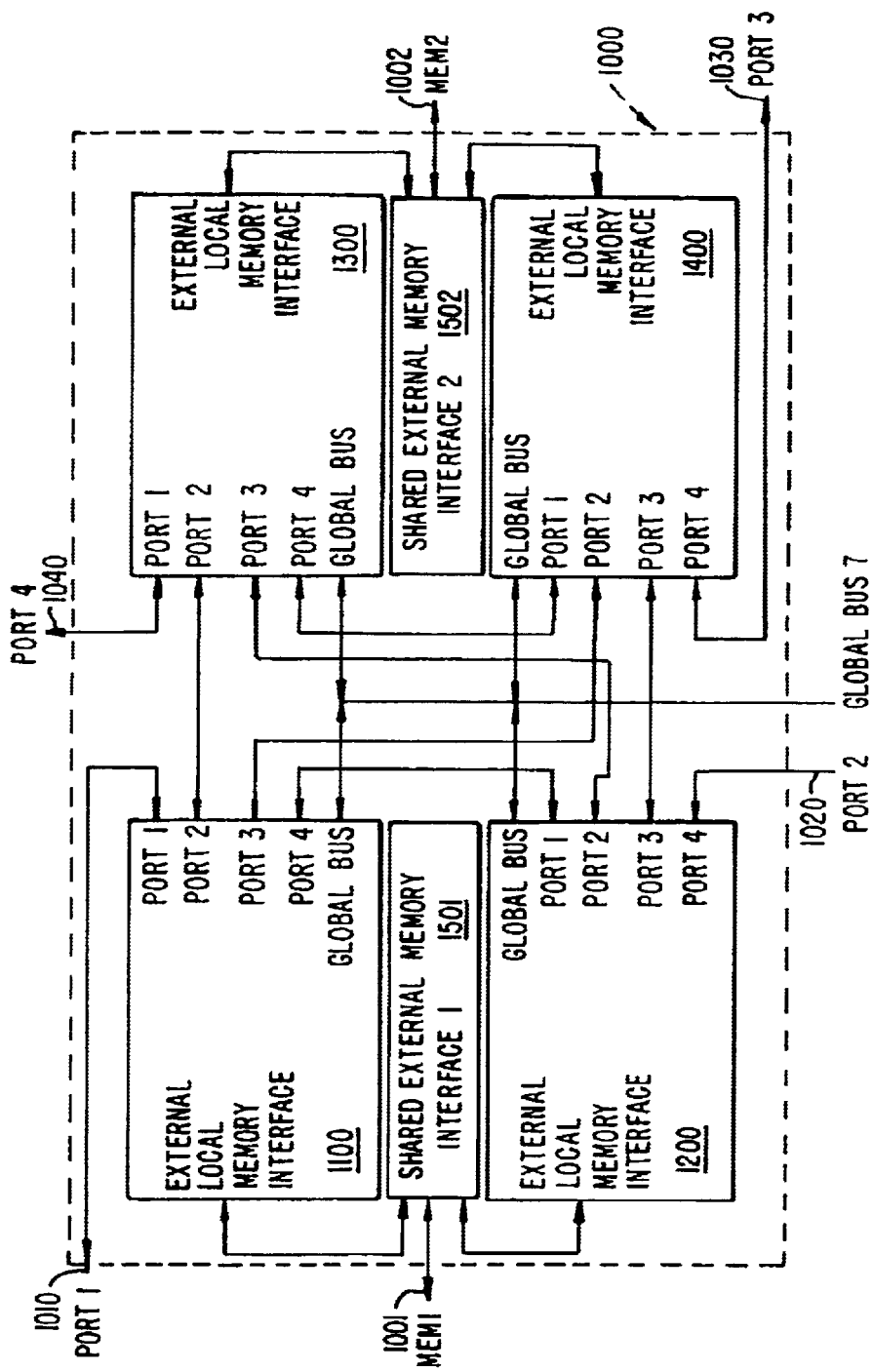
FIG. 10 is a block diagram of an integrated circuit having four instances of the basic circuit of FIG. 1 with two shared external memory interfaces and fully interconnected message ports.

FIG. 10 is a block diagram of an integrated circuit having four instances of the basic circuit of FIG. 1 with two shared external memory interfaces and fully interconnected message ports.

Figure 11:
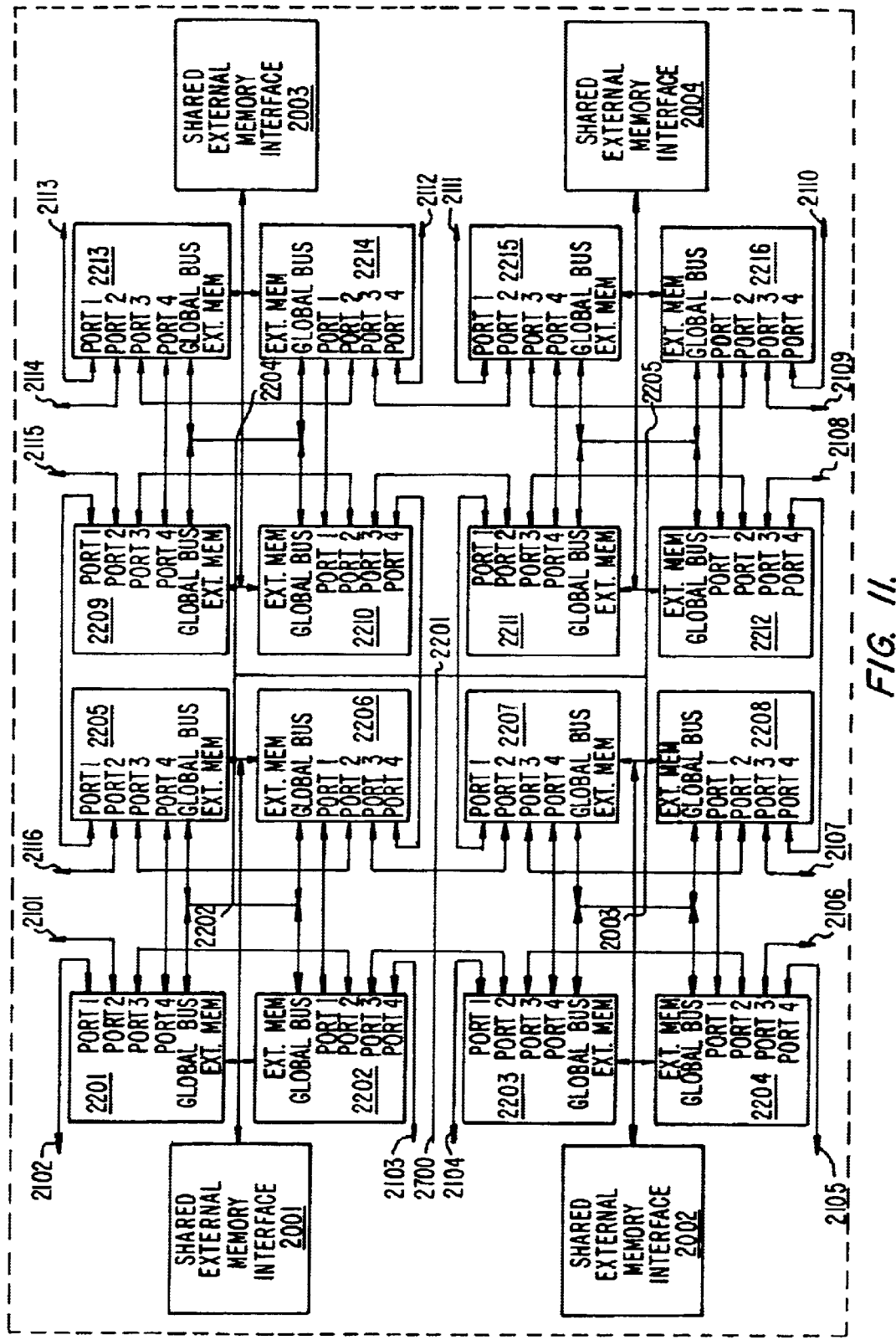
FIG. 11 is a block diagram of an integrated circuit having sixteen instances of the basic circuit of FIG. 1 with four shared memory interfaces.

FIG. 11 is a block diagram of an integrated circuit having sixteen instances of the basic circuit of FIG. 1 with four shared memory interfaces.

Figure 12:
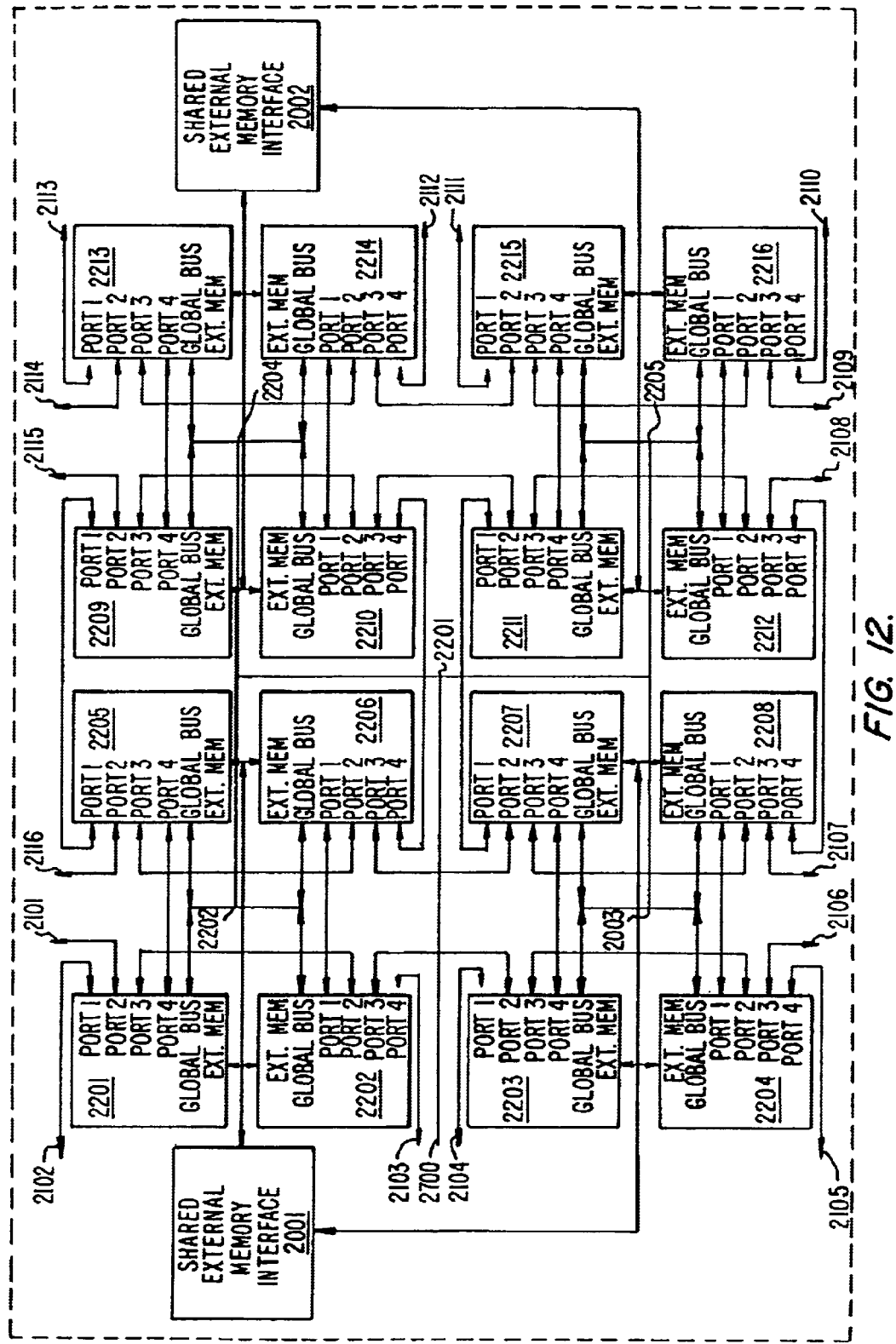
FIG. 12 is a block diagram of an integrated circuit having sixteen instances of the basic circuit of FIG. 1 with two shared memory interfaces.

FIG. 12 is a block diagram of an integrated circuit having sixteen instances of the basic circuit of FIG. 1 with two shared memory interfaces.

Figure 13:
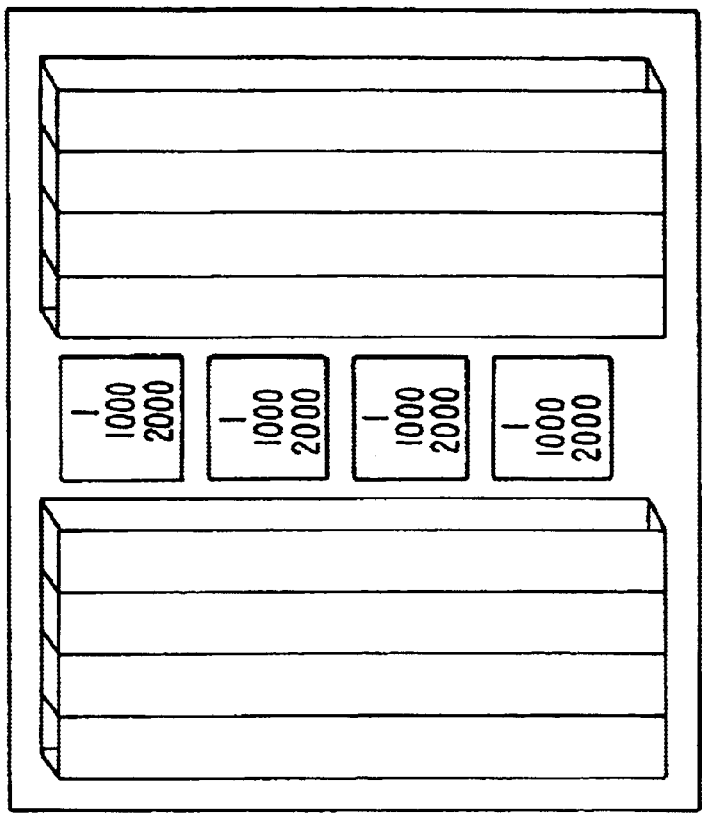
FIG. 13 is a block diagram of a printed circuit board uniting instances of the of the basic circuit of FIG. 1 with their corresponding memory modules.

FIG. 13 is a block diagram of a printed circuit board uniting instances of the of the basic circuit of FIG. 1 with their corresponding memory modules.

Figure 14:
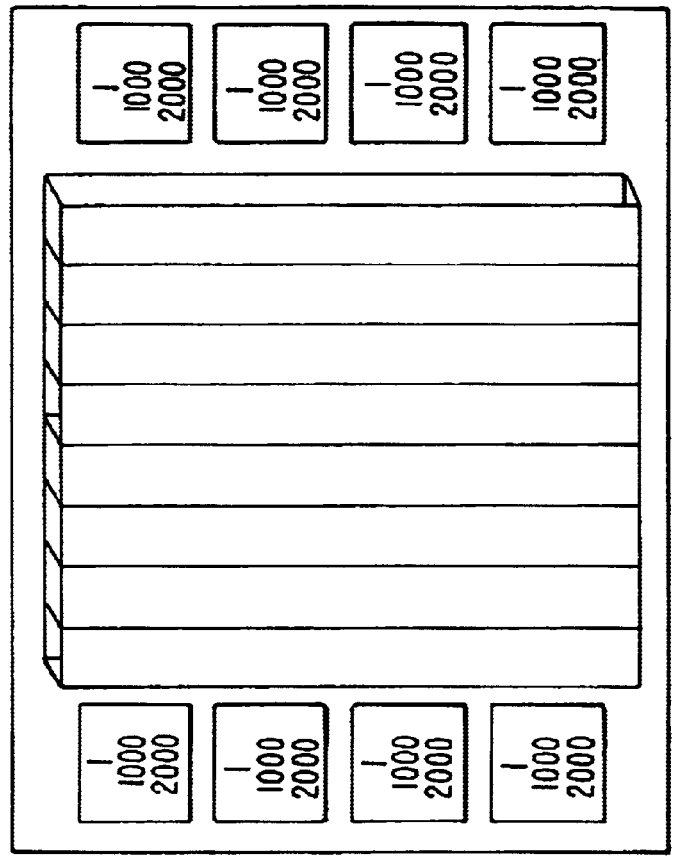
FIG. 14 is a block diagram of another printed circuit board uniting instances of the of the basic circuit of FIG. 1 and their corresponding memory modules.

FIG. 14 is a block diagram of another printed circuit board uniting instances of the of the basic circuit of FIG. 1 and their corresponding memory modules.

REFERENCES

1. Ubois, Jeff, "Sun goes Hollywood: 117 SPARCstations render "Toy Story", the first feature-length computer-animated film", SunWorld Online, November 1995, a world wide web electronic magazine to be found at http://www.sun.com/sunworldonline/swol-11-1995/swol-11-pixar.h tml 2. Fuchs, Henry, U.S. Pat. No. 4,590,465, "Graphics Display System Using Logic-Enhanced Pixel Memory Cells", Filed Feb. 18, 1982, granted May 20, 1986.

3. Andrews, David H., et. al. U.S. Pat. No. 4,646,075, "System and Method for a Data Processing Pipeline", Filed Nov. 3, 1983, granted Feb. 24, 1987.

4. Littlefield, Richard, U.S. Pat. No. 4,949,280, "Parallel Processor-based Raster Graphics System Architecture", Filed May 10, 1988, granted Aug. 14, 1990.

5. Hedley, David, et. al., U.S. Pat. No. 4,953,107, "Video Signal Processing", Filed Aug. 28, 1989, granted Aug. 28, 1990.

6. Westberg, Thomas, et. al., U.S. Pat. No. 5,101,365, "Apparatus for Extending Windows Using Z Buffer Memory", Filed Nov. 7, 1990, granted Mar. 31, 1992.

7. Cawley, Robin, U.S. Pat. No. 5,103,217, "Electronic Image Processing", Filed Nov. 29, 1988, granted Apr. 7, 1992

8. Liang, Bob, et. al., U.S. Pat. No. 5,182,797, "Multi-Processor Graphics Display System for Displaying Hierarchical Data Structures", Filed May 27, 1992, granted Jan. 26, 1993.

9. Sokai, Toshio, et. al. U.S. Pat. No. 5,594,844, "Three Dimensional View Using Ray Tracing Through Voxels Sub-divided Numerically Using Object Based Parameters", Filed Jan. 25, 1994, granted Jan. 14, 1997.

10. Uhlin, Keith, U.S. Pat. No. 5,630,043, "Animated Texture Map Apparatus and Method for 3-D Image Displays", Filed May 11, 1995, granted May 13, 1997.

11. Oppenheim, Alan & Schafer, Ronald, *Digital Signal Processing*, © 1975, Prentice Hall, Englewood Cliffs, N.J., 12. Oppenheim, Alan & Schafer, Ronald, *Discrete-Time Signal Processing*, © 1989, Prentice Hall, ISBN 0-13-216292-X 13. Barnsley, Michael & Hurd, Lyman, *Fractal Image Compression*, © 1993, AK Peters, Ltd., Wellsley, Mass. 02181, ISBN 1-56881-000-8

14. Daubechies, Ingrid, *Ten Lectures on Wavelets*, © 1992, Society of Industrial and Applied Mathematics, ISBN 0-89871-274-2

15. Kaiser, Gerald, *A friendly guide to wavelets*, © 1994, Birkhauser, Boston, ISBN 0-8176-3711-7

16. Fisher, Yuval (ed.), *Fractal Image Compression*, © 1995 Springer-Verlag, New York, ISBN 0-387-94211-4

17. McGregor, D. R., et. al. "Faster Fractal Compression", Dr. Dobb's Journal, January, 1996, pp 34, etc.

18. Lim, Jae, *Two-Dimensional Signal and Image Processing*, © 1990, Prentice Hall, ISBN 0-13-935322-4

19. Glassner, Andrew, *Principles of Digital Image Synthesis*, vol. 1 & 2, © 1995 Morgan Kauffman Publishers, Inc., ISBN 1-55860-276-3

20. Foley, James, et. al., *Computer graphics: principles and practice—$2^{nd}$ ed. In C*, © 1996, 1990, Addison-Wesley Publishing Company, ISBN 0-201-84840-6

21. Watt, Alan, *3D Computer Graphics*, $2^{nd}$ ed., © 1993, Addison-Wesley Publishers, Ltd., ISBN 0-201-63186-5

22. Watt, Alan & Watt, Mark, *Advanced animation and rendering techniques*, © 1992, ACM Press, ISBN 0-201-54412-1

23. Prusinkiewicz, Przemyslaw & Lindenayer, Aristid, et. al., *The Algorithmic Beauty of Plants*, © 1990, Springer-Verlag New York, Inc., ISBN 0-387-97297-8

24. Iwata, Eiji, et. al., "A 2.2GOPS Video DSP th 2-RISC MIMD, 6-PE SIMD Architecture for Real-Time MPEG2 Video Coding/Decoding", 1997 IEEE International Solid-State Circuits Conference, © 1997 IEEE, ISBN 0-7803-3721-2, pages 258–259.

25. Silverbrook, Kia, U.S. Pat. No. 5,590,252, "Video processor system and audio processor system", Filed Apr. 28, 1993, granted Dec. 31, 1996.

26. Uhlin, Keith, U.S. Pat. No. 5,630,043, "Animated Texture map Apparatus and method for 3-D image displays", Filed May 11, 1995, granted May 13, 1997

27. Sakai, Toshio, et. al., U.S. Pat. No. 5,594,844, "Three Dimensional View Using Ray Tracing Through Voxels Sub-divided Numerically using object based parameters", Filed Jan. 25, 1994, granted Jan. 14, 1997

28. Greene, Edward, et. al., U.S. Pat. No. 5,579,455, "Rendering of 3D Scenes on a display Using Hierarchical Z-Buffer Visibility", Filed Jul. 30, 1993, granted Nov. 26, 1996

29. Poulton, John, et. al., U.S. Pat. No. 5,481,669, "Architecture and Apparatus for Image Generation Utilizing Enhanced Memory Devices", Filed Feb. 6, 1995, granted Jan. 2, 1996

30. Patterson, David & Hennessey, John, *Computer Architecture: A Quantitative Approach* ($2^{nd}$ ed.), © 1990,1996, Morgan Kauffman Publishers, Inc., ISBN 1-55860-329-8.

31. Johnson, Mike, *Superscalar Microprocessor Design*, © 1991, P T R Prentice-Hall, Inc., Englewood Cliffs, N.J., ISBN 0-13-875634-1.

32. Murakami, Kazuaki, et. al., "Parallel Processing RAM Chip with 256 Mb DRAM and Quad Processors", 1997 *IEEE International Solid-State Circuits Conference*, pages 228–229, ISBN 0-7803-3721-2.

33. Aimoto, Yoshiharu, et. al., "A 7.68 GIPs 3.84 GB/s 1W Parallel Image-Processing RAM Integrating a 16 Mb DRAM and 128 Processors", 1996 *IEEE International Solid-State Circuits Conference*, pages 372–373, ISBN 0-7803-3136-2.

34. Yao, Yong, "Chromatic's Mpact 2 Boosts 3D: Mpact/3000 Becomes First Media Processor to Ship in Volume", pages 1, 6–10, *Microprocessor Report*, Vol. 10, No. 15, Nov. 18, 1996, © 1996, Microdesign Resources 35. Shimizu, Tonu, et. al., "A Multimedia 32b RISC Microprocessor with 16 Mb DRAM", 1996 *IEEE International Solid-State Circuits Conference*, pages 216–217, ISBN 0-7803-3136-2.

36. Glaskowsky, Peter, "Fujitsu Aims Media Processor at DVD: MMA Combines Long-Instruction-Word Core, Integrated Peripherals", pages 11–13, *Microprocessor Report*, Vol. 10, No. 15, Nov. 18, 1996, © 1996, Microdesign Resources 37. "Samsung announces Multimedia Signal Processor", *The John Peddie Associates PC Graphics Report*, Aug. 20, 1996, © 1996, John Peddie Associates, Tiburon, Calif. 94920, pages 1153–1156.

38. Yao, Yong, "Samsung Launches Media Processor: MSP is Designed for Microsoft's New 3D-Software Architecture", pages 1, 6–9, *Microprocessor Report*, Vol. 10, No. 11, Aug. 26, 1996, © 1996, Microdesign Resources 39. "Chromatic rolls out Mpact", *The John Peddie Associates PC Graphics Report*, Aug. 27, 1996, © 1996, John Peddie Associates, Tiburon, Calif. 94920, pages 1182–1183

40. Romney, Gordon, et. al. U.S. Pat. No. 3,621,214, "Electronically Generated Perspective", Filed Nov. 13, 1968, granted Nov. 16, 1971.

41. Gove, Robert, U.S. Pat. No. 5,410,649, "Imaging Computer System and Network", Filed Jun. 29, 1992, granted Apr. 25, 1995.

42. Gove, Robert, et. al., U.S. Pat. No. 5,522,083, "Reconfigurable Multi-Processor Operating in SIMD Mode with one processor fetching instructions for use by remaining processors", Filed Jun. 22, 1994, granted May 28, 1996.

43. "TMX320C6201 Digital Signal Processor: Product Preview", SPRS051.pdf—January, 1997, © 1997 Texas Instruments, available from the Texas Instruments Web-site http://www.ti.com 44. Weinreb, Daniel and Moon, David, *Flavors: Message Passing in the Lisp Machine*, AI Memo 602, November, 1980, M.I.T. Artificial Intelligence Lab.

45. Dally, William, et. al., *Message-Driven Processor Architecture, Version* 11, AI memo 1069, August 1988, M.I.T. Artificial Intelligence Lab.

46. Cray, Seymour, U.S. Pat. No. 4,128,880, Filed Jun. 30, 1976, granted Dec. 5, 1978

47. Beard, Douglas, et. al., U.S. Pat. No. 5,544,337, "Vector Processor having Registers for Control by Vector Registers", Filed Jun. 7, 1995, granted Aug. 6, 1996

48. Yoshinaga, Toru and Shinjo, Naoki, U.S. Pat. No. 5,598,574, "Vector Processing Device", Filed Mar. 18, 1996, granted Jan. 28, 1997

49. Cray, Seymour, U.S. Pat. No. 3,833,889, "Multi-mode Data Processing System", Filed Mar. 8, 1973, granted Sep. 3, 1974

50. Porter, John, et. al., U.S. Pat. No. 4,589,067, "Full Floating Point Vector Processor with Dynamically Configurable Multifunction Pipelined ALU", filed May 27, 1983, granted May 13, 1986

51. Ellis, James, et. al., U.S. Pat. No. 5,418,973, "Digital Computer System with Cache Controller Coordinating both Vector and Scalar Operations", filed Jan. 22, 1992, granted May 23, 1995

52. Omoda, Koichiro, et. al. U.S. Pat. No. 4,651,274, "Vector Data Processor", Filed Mar. 28, 1984, granted Mar. 17, 1987

53. Gallup, Michael, et. al., U.S. Pat. No. 5,600,846, "Data processing system and method thereof", Filed Feb. 17, 1995, granted Feb. 4, 1997

54. Prince, Betty, *Semiconductor Memories: A Hanbook of Design, Manufacture and Application*, $2^{nd}$ ed., © 1983, 1991 John Wiley & Sons, Ltd., ISBN 0-471-94295-2.

55. *Product Description: The MIPS16 Application Specific Extension*, v1.1, found through the Silicon Graphics Incorporated website on Jul. 24, 1997, http://www.sgi.com/MIPS/mips16.pdf 56. *An Introduction to Thumb™* v.2.0, Issued March, 1995, © Advanced RISC Machines Ltd. (ARM) 1995.

57. "Volume 1 Editorial", *Image Communication Journal: Special Issue on MPEG*-4, downloaded the week of Jul. 17, 1997, from http://drogo/cselt.stet.it/ufv/leonardo/icjfiles/mepg-4_si/pap er0.htm 58. Koenen, Rob, Pereira, F., and Chiariglione, L. "MPEG4: Context and Objectives", *Image Communication Journal: Special Issue on MPEG*-4, downloaded the week of Jul. 17, 1997, from http://drogo/cselt.stet.it/ufv/leonardo/icjfiles/mepg-4_si/pap er1.htm 59. Contin, L, et. al. "Tests on MPEG-4 Audio Codec Proposals", *Image Communication Journal: Special Issue on MPEG*-4, downloaded the week of Jul. 17, 1997, from http://drogo/cselt.stet.it/ufv/leonardo/icjfiles/mepg-4_si/pap er3.htm 60. Osterman, Jörn, "Methodologies Used for Evaluation of Video Tools and Algorithms in MPEG-4", *Image Communication Journal: Special Issue on MPEG*-4, downloaded the week of Jul. 17, 1997, from http://drogo/cselt.stet.it/ufv/leonardo/icjfiles/mepg-4_si/pap er4.htm 61. Ebrahimi, Touradj, "MPEG-4 Video Verification Model: A video encoding/decoding algorithm based on content representation", *Image Communication Journal: Special Issue on MPEG*-4, downloaded the week of Jul. 17, 1997, from http://drogo/cselt.stet.it/ufv/leonardo/icjfiles/mepg-4_si/pap er5.htm 62. Avaro, O. et. al. "The MPEG-4 Systems and Description Languages: A way ahead in Audio Visual Information Representation", *Image Communication Journal: Special Issue on MPEG*-4, downloaded the week of Jul. 17, 1997, from http://drogo/cselt.stet.it/ufv/leonardo/icjfiles/mepg-4_si/pap er6.htm 63. Doenges, P. et. al. "MPEG-4: Audio/Video & Synthetic Graphics/Audio for Mixed Media", *Image Communication Journal: Special Issue on MPEG*-4, downloaded the week of Jul. 17, 1997, from http://drogo/cselt.stet.it/ufv/leonardo/icjfiles/mepg-4_si/pap er7.htm 64. Gosling, James, Joy, Bill and Steele, Guy, *The Java™ Language Specification*, © 1996 Sun Microsystems, Inc. published by Addison-Wesley, ISBN 0-201-63451-1

65. Arnold, Ken and Gosling, James, *The Java™ Programming Language*, © 1996 Sun Microsystems Inc. published by Addison-Wesley, ISBN 0-201-63455-4

66. Intel, *Accelerated Graphics Port Interface Specification*, rev. 1.0, Intel Corporation, Jul. 31, 1996

67. *Universal Serial Bus Specification*, rev. 1.0, by Compag, Digital Equipment Corporation, IBM PC Company, Intel, Microsoft, NEC, Northern Telecom, Jan. 15, 1996

68. Solari, Edward and Willse, George, *PCI Hardware and Software*, $3^{rd}$ *Edition*, © 1994, 1995, 1996, Published by Annabooks, San Diego, Calif., ISBN 0-92392-32-9, Fifth printing, January, 1996

69. Shanley, Tom, Anderson, Don, *PCI System Architecture, 3rd Edition*, © 1995Mindshare, Inc., ISBN 0-201-40993-3, First Printing, February 1995

70. Papaichalis, Panos and So, John, "Implementation of Fast Fourier Transform Algorithms with the TMS32020", pages 84–85, *Digital Signal Processing Applications with te TMS320 Family*, © 1986 Texas Instruments, Incorporated.

What is claimed is:

1. An integrated circuit using a memory, said integrated circuit comprising:
    an interface circuit configured to control access to said memory, said interface circuit coupled to said memory;
    an embedded processor configured to control said integrated circuit, said embedded processor receiving information from said interface circuit; and
    an array processor for performing mathematical calculations on data received from said interface circuit and connected to said embedded processor via an internal bus, said array processor comprising:
        a plurality of multiplier/accumulator circuits;
        a plurality of shared operand circuits coupled to said plurality of multiplier/accumulator circuits for simultaneously providing a shared operand to at least two of said plurality of multiplier/accumulator circuits; and
        a shared output and feedback interface coupled to receive outputs from the at least two of the plurality of multiplier/accumulator circuits and to provide them for further processing by the at least two of the multiplier/accumulator circuits,
    wherein each of the plurality of shared operand circuits comprise:
        a front end unit for determining a fixed point result by performing a fixed point addition or subtraction on a plurality of operands; and
        a floating point conversion unit for converting said fixed point result to a first floating point result.

2. An integrated circuit comprising:
    a first embedded processor;
    a first array processor coupled to the first embedded processor;
    a first memory interface circuit coupled to the first embedded processor and the first array processor;
    a first communication port coupled to the first embedded processor;
    a second communication port configured to communicate with the first communication port;
    a second embedded processor coupled to the second communication port;
    a second array processor coupled to the second embedded processor; and
    a second memory interface circuit coupled to the second embedded processor and the second array processor,
    wherein the first array processor comprises at least two arithmetic processing units, each of the at least two arithmetic processing units comprises:
        a first MAC unit coupled to a first local memory;
        a second MAC unit coupled to a second local memory;
        a third MAC unit coupled to a third local memory;
        a shared operand unit coupled to provide a shared operand to the first MAC unit, the second MAC unit, and the third MAC unit; and
        a shared output and feedback interface coupled to receive a first output from the first MAC unit, a second output from the second MAC unit, and a third output from the third MAC unit, and further coupled to provide the first output to the first local memory, the second output to the second local memory, and the third output to the third local memory.

3. The integrated circuit of claim 2 wherein the at least two arithmetic processing units are three arithmetic processing units.

4. The integrated circuit of claim 2 wherein each of the at least two arithmetic processing units further comprises a fourth MAC unit coupled to a fourth local memory.

5. An integrated circuit comprising:
    an interface circuit configured to receive data from an external memory;
    a first embedded processor configured to control the interface circuit;
    a first array processor configured to receive data from the interface and to perform arithmetic calculations;
    a first communication port coupled to the first embedded processor and the first array processor for communicating with a second array processor and a second embedded processor,
    the array processor comprising:
        a first MAC unit configured to receive data from a first local memory;
        a second MAC unit configured to receive data from a second local memory;
        a third MAC unit configured to receive data from a third local memory;
        a first shared output and feedback circuit configured to receive data from the first MAC unit, the second MAC unit, and third MAC unit, and further configured to provide data to the first local memory, the second local memory, and the third local memory;
        a fourth MAC unit configured to receive data from a fourth local memory;
        a fifth MAC unit configured to receive data from a fifth local memory; and
        a second shared output and feedback circuit configured to receive data from the fourth MAC unit and the fifth MAC unit, and further configured to provide data to the fourth local memory and the fifth local memory.

6. The integrated circuit of claim 5 wherein the array processor further comprises:
    a first shared operand circuit configured to simultaneously provide a shared operand to the first MAC unit, the second MAC unit, and the third MAC unit.

7. The integrated circuit of claim 6 wherein the array processor further comprises:
    a second shared operand circuit configured to simultaneously provide a shared operand to the fourth MAC unit and the fifth MAC unit.

8. A frame rendering integrated circuit comprising:
    an interface circuit coupled to an external memory;
    an embedded processor coupled to the interface circuit and configured to control the integrated circuit; and
    an array processor coupled to the interface circuit, wherein the array processor performs arithmetic calculations;
    wherein the array processor comprises:
        a first multiply/accumulator (MAC) unit coupled to a first local memory, the first local memory comprising a first plurality of operands;

a second MAC unit coupled to a second local memory, the second local memory comprising a second plurality of operands;

a third MAC unit coupled to a third local memory, the third local memory comprising a third plurality of operands;

a fourth MAC unit coupled to a fourth local memory, the fourth local memory comprising a fourth plurality of operands;

a fifth MAC unit coupled to a fifth local memory, the fifth local memory comprising a fifth plurality of operands;

a sixth MAC unit coupled to a sixth local memory, the sixth local memory comprising a sixth plurality of operands;

a first shared operand unit coupled to the first MAC unit, the second MAC unit, and the third MAC unit, and a second shared operand unit coupled to the fourth MAC unit, the fifth MAC unit, and the sixth MAC unit.

9. The integrated circuit of claim 8 wherein the array processor further comprises:

a first shared output and feedback interface coupled to the first MAC unit, the second MAC unit, and the third MAC unit, and further coupled to the first local memory, the second local memory, and the third local memory.

10. The integrated circuit of claim 9 wherein the shared operand provides a shared operand to the first MAC unit for computing a first result in association with the first plurality of operands, to the second MAC unit for computing a second result in association with the second plurality of operands, and to the third MAC unit for computing a third result in association with the third plurality of operands.

11. The integrated circuit of claim 10 wherein the first result, the second result, and the third result are computed independently of each other.

12. The integrated circuit of claim 11 wherein the first shared output and feedback interface receives the first result from the first MAC unit, the second result from the second MAC unit, and the third result from the third MAC unit, and provides the first result to the first local memory, the second result to the second local memory, and the third result to the third local memory.

13. The integrated circuit of claim 8 wherein the array processor further comprises:

a second shared output and feedback interface coupled to the fourth MAC unit, the fifth MAC unit, and the sixth MAC unit, and further coupled to the fourth local memory, the fifth local memory, and the sixth local memory.

* * * * *